United States Patent
Harris et al.

(10) Patent No.: US 12,064,938 B2
(45) Date of Patent: Aug. 20, 2024

(54) GLASS LAMINATES HAVING DETERMINED STRESS PROFILES AND METHODS OF MAKING THE SAME

(71) Applicant: CORNING INCORPORATED, Corning, NY (US)

(72) Inventors: Jason Thomas Harris, Horseheads, NY (US); Jin Su Kim, Seoul (KR); Peter Joseph Lezzi, Corning, NY (US); Natesan Venkataraman, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 358 days.

(21) Appl. No.: 17/605,103

(22) PCT Filed: Apr. 13, 2020

(86) PCT No.: PCT/US2020/027913
§ 371 (c)(1),
(2) Date: Oct. 20, 2021

(87) PCT Pub. No.: WO2020/219290
PCT Pub. Date: Oct. 29, 2020

(65) Prior Publication Data
US 2022/0212446 A1 Jul. 7, 2022

Related U.S. Application Data

(60) Provisional application No. 62/837,411, filed on Apr. 23, 2019.

(51) Int. Cl.
*B32B 15/04* (2006.01)
*B32B 17/06* (2006.01)
(Continued)

(52) U.S. Cl.
CPC .......... *B32B 17/06* (2013.01); *C03B 17/064* (2013.01); *C03B 27/0413* (2013.01);
(Continued)

(58) Field of Classification Search
CPC ...................................................... B32B 17/06
(Continued)

(56) References Cited

U.S. PATENT DOCUMENTS 1,951,950 A   3/1934 Rising
2,145,119 A   1/1939 Littleton
(Continued)

FOREIGN PATENT DOCUMENTS

AU   42657/72 A   11/1973
AU   05245/73 B2   9/1982
(Continued)

OTHER PUBLICATIONS

Tandon, Rajan et al., "Controlling the Fragmentation Behavior of Stressed Glass," Fracture Mechanics of Ceramics, vol. 14, 2005, pp. 77.
(Continued)

*Primary Examiner* — Lauren R Colgan
(74) *Attorney, Agent, or Firm* — Daniel J. Greenhalgh

(57) ABSTRACT

A laminated glass article comprises a core layer comprising a core glass composition having an average core coefficient of thermal expansion ($CTE_{core}$) and a clad layer directly adjacent to the core layer and comprising a clad glass composition having an average clad coefficient of thermal expansion ($CTE_{clad}$) that is less than the $CTE_{core}$ such that the clad layer is in compression and the core layer is in tension. A compressive stress of the clad layer increases with increasing distance from the outer surface of the clad layer, transitions to a minimum tensile stress as a step-change at an interface region between the core layer and the clad layer, (Continued)

and a magnitude of the tensile stress increases continuously to a maximum tensile stress in the core layer. Other stress profiles, and methods of preparing laminated glass articles are also disclosed.

9 Claims, 12 Drawing Sheets

(51) Int. Cl.
  *C03B 17/06* (2006.01)
  *C03B 27/04* (2006.01)
  *C03B 27/052* (2006.01)
  *C03C 21/00* (2006.01)
  *C03C 23/00* (2006.01)
  *B32B 7/027* (2019.01)

(52) U.S. Cl.
  CPC ........ *C03B 27/0526* (2013.01); *C03C 21/002* (2013.01); *C03C 23/007* (2013.01); *B32B 7/027* (2019.01); *B32B 2307/50* (2013.01); *C03C 2203/50* (2013.01)

(58) Field of Classification Search
  USPC .......................................... 428/410, 426, 428
  See application file for complete search history.

(56) References Cited

U.S. PATENT DOCUMENTS

| | | |
|---|---|---|
| 2,177,336 A | 10/1939 | Shaver et al. |
| 3,107,196 A | 10/1963 | Acloque |
| 3,169,900 A | 2/1965 | Ermlich |
| 3,174,839 A | 3/1965 | Long |
| 3,223,499 A | 12/1965 | Cypher et al. |
| 3,223,501 A | 12/1965 | Fredley et al. |
| 3,223,549 A | 12/1965 | Fredley et al. |
| 3,225,349 A | 12/1965 | Thor |
| 3,279,906 A | 10/1966 | Baker |
| 3,287,200 A | 11/1966 | Hess et al. |
| 3,293,015 A | 12/1966 | Fredley et al. |
| 3,332,759 A | 7/1967 | McMaster et al. |
| 3,374,078 A | 3/1968 | Wright |
| 3,409,422 A | 11/1968 | Gulotta |
| 3,423,198 A | 1/1969 | McMaster et al. |
| 3,445,316 A | 5/1969 | Megles |
| 3,449,102 A | 6/1969 | Nedelec et al. |
| 3,497,340 A | 2/1970 | Dennison et al. |
| 3,556,757 A | 1/1971 | Kozlowski et al. |
| 3,558,415 A | 1/1971 | Rieser et al. |
| 3,607,169 A | 9/1971 | Coxe |
| 3,637,453 A | 1/1972 | Simmons |
| 3,673,049 A | 6/1972 | Giffen et al. |
| 3,679,388 A | 7/1972 | Giddings et al. |
| 3,744,921 A | 7/1973 | Weller et al. |
| 3,753,674 A | 8/1973 | Ohlberg et al. |
| 3,776,712 A | 12/1973 | Wilde |
| 3,793,127 A | 2/1974 | Wartenberg |
| 3,794,476 A | 2/1974 | Michalik et al. |
| 3,830,540 A | 8/1974 | Sperry |
| 3,844,758 A | 10/1974 | Wartenberg |
| 3,850,679 A | 11/1974 | Sopko et al. |
| 3,883,339 A | 5/1975 | Michalik et al. |
| 3,890,128 A | 6/1975 | Melling et al. |
| 3,902,884 A | 9/1975 | Harrison |
| 3,929,442 A | 12/1975 | Neely, Jr. |
| 3,931,438 A | 1/1976 | Beall et al. |
| 3,936,291 A | 2/1976 | McMaster |
| 3,973,943 A | 8/1976 | Seymour |
| 3,994,711 A | 11/1976 | McMaster |
| 4,081,254 A | 3/1978 | Matsumoto et al. |
| 4,091,163 A | 5/1978 | Clausen |
| 4,107,460 A | 8/1978 | Grunza et al. |
| 4,128,690 A | 12/1978 | Boardman et al. |
| 4,194,898 A | 3/1980 | Marsh et al. |
| 4,198,226 A | 4/1980 | Marsh et al. |
| 4,198,463 A | 4/1980 | Greenhalgh |
| 4,204,845 A | 5/1980 | Shields et al. |
| 4,214,886 A | 7/1980 | Shay et al. |
| 4,286,052 A | 8/1981 | Ernsberger |
| 4,300,936 A | 11/1981 | Quillevere et al. |
| 4,314,836 A | 2/1982 | Seymour |
| 4,319,907 A | 3/1982 | Pike |
| 4,332,605 A | 6/1982 | Wright et al. |
| 4,372,774 A | 2/1983 | Cross et al. |
| 4,400,193 A | 8/1983 | Cross et al. |
| 4,470,838 A | 9/1984 | McMaster et al. |
| 4,471,024 A | 9/1984 | Pargamin et al. |
| 4,494,972 A | 1/1985 | Marsh et al. |
| 4,516,999 A | 5/1985 | Kiefer et al. |
| 4,662,926 A | 5/1987 | Aratani et al. |
| 4,690,871 A | 9/1987 | Gordon |
| 4,744,676 A | 5/1988 | Lind |
| 4,773,926 A | 9/1988 | Letemps et al. |
| 4,826,525 A | 5/1989 | Chesworth et al. |
| 4,913,720 A | 4/1990 | Gardon et al. |
| 4,973,163 A | 11/1990 | Sakai et al. |
| 4,985,275 A | 1/1991 | Takemura et al. |
| 5,009,694 A | 4/1991 | Nishitani et al. |
| 5,057,375 A | 10/1991 | Gordon |
| 5,071,796 A | 12/1991 | Jones et al. |
| 5,121,329 A | 6/1992 | Crump |
| 5,213,440 A | 5/1993 | Yeh et al. |
| 5,236,488 A | 8/1993 | Vehmas |
| 5,285,517 A | 2/1994 | Wu |
| 5,340,433 A | 8/1994 | Crump |
| 5,500,287 A | 3/1996 | Henderson |
| 5,626,911 A | 5/1997 | Bertin et al. |
| 5,643,649 A | 7/1997 | Hagan et al. |
| 5,654,057 A | 8/1997 | Kitayama et al. |
| 5,676,722 A | 10/1997 | Seidel et al. |
| 5,735,923 A | 4/1998 | Hisaeda |
| 5,795,659 A | 8/1998 | Meelu et al. |
| 5,885,316 A | 3/1999 | Sato et al. |
| 5,931,981 A | 8/1999 | McMaster et al. |
| 5,938,808 A | 8/1999 | McMaster et al. |
| 5,938,810 A | 8/1999 | De Vries et al. |
| 5,939,175 A | 8/1999 | Sugiura |
| 5,972,513 A | 10/1999 | Yoshizawa |
| 6,053,011 A | 4/2000 | Lisec |
| 6,079,227 A | 6/2000 | Yoshizawa et al. |
| 6,094,943 A | 8/2000 | Okuda et al. |
| 6,117,283 A | 9/2000 | Chen et al. |
| 6,183,565 B1 | 2/2001 | Granneman et al. |
| 6,200,665 B1 | 3/2001 | Seto |
| 6,295,842 B1 | 10/2001 | McMaster |
| 6,336,775 B1 | 1/2002 | Morita et al. |
| 6,353,283 B1 | 3/2002 | Ghosh et al. |
| 6,370,917 B1 | 4/2002 | Kato et al. |
| 6,412,309 B1 | 7/2002 | Kajii et al. |
| 6,442,017 B1 | 8/2002 | Ewing et al. |
| 6,461,439 B1 | 10/2002 | Granneman et al. |
| 6,472,800 B2 | 10/2002 | Goda et al. |
| 6,598,427 B1 | 7/2003 | Douche et al. |
| 6,613,685 B1 | 9/2003 | Granneman et al. |
| 6,642,017 B2 | 11/2003 | Weiser |
| 6,656,597 B2 | 12/2003 | Takahara |
| 6,713,180 B1 | 3/2004 | Torr et al. |
| 6,722,160 B1 | 4/2004 | Nemugaki et al. |
| 6,770,851 B2 | 8/2004 | Granneman et al. |
| 6,805,749 B2 | 10/2004 | Granneman et al. |
| 6,826,929 B2 | 12/2004 | Boaz |
| 6,877,250 B2 | 4/2005 | Granneman et al. |
| 6,881,485 B2 | 4/2005 | Kato et al. |
| 6,881,931 B2 | 4/2005 | Vehmas et al. |
| 6,977,710 B2 | 12/2005 | Akiyama et al. |
| 7,022,627 B2 | 4/2006 | Granneman et al. |
| 7,048,488 B1 | 5/2006 | Kuznetsov et al. |
| 7,153,798 B2 | 12/2006 | Bordeaux et al. |
| 7,215,262 B2 | 5/2007 | Suzuki et al. |
| 7,261,939 B2 | 8/2007 | Hallett et al. |
| 7,306,848 B2 | 12/2007 | Tominaga et al. |
| 7,312,156 B2 | 12/2007 | Granneman et al. |

(56) References Cited

U.S. PATENT DOCUMENTS

| | | | |
|---|---|---|---|
| 7,341,968 B2 | 3/2008 | Yoda et al. | |
| 7,367,205 B1 | 5/2008 | Boaz | |
| 7,410,355 B2 | 8/2008 | Granneman et al. | |
| 7,566,673 B2 | 7/2009 | Kawai | |
| 7,666,511 B2 | 2/2010 | Ellison et al. | |
| 7,694,532 B1 | 4/2010 | Boaz | |
| 7,867,932 B2 | 1/2011 | Beall | |
| 7,908,885 B2 | 3/2011 | Devitt | |
| 8,074,473 B2 | 12/2011 | Nitschke et al. | |
| 8,233,433 B2 | 7/2012 | Kalhan | |
| 8,234,883 B2 | 8/2012 | Krall et al. | |
| 8,289,342 B2 | 10/2012 | Matsumoto | |
| 8,415,013 B2 | 4/2013 | Barefoot et al. | |
| 8,524,804 B2 | 9/2013 | Kitano et al. | |
| 8,585,463 B2 | 11/2013 | Nakae | |
| 8,679,599 B2 | 3/2014 | Grzybowski et al. | |
| 8,713,967 B2 | 5/2014 | Danielson et al. | |
| 8,713,972 B2 | 5/2014 | Lakota et al. | |
| 8,728,961 B2 | 5/2014 | Lautenschlaeger et al. | |
| 8,759,238 B2 | 6/2014 | Chapman et al. | |
| 8,765,262 B2 | 7/2014 | Gross | |
| 8,769,990 B2 | 7/2014 | Saito et al. | |
| 8,776,548 B2 | 7/2014 | Dannoux et al. | |
| 8,802,581 B2 | 8/2014 | Dejneka et al. | |
| 8,821,999 B2 | 9/2014 | Grzybowski et al. | |
| 8,854,623 B2 | 10/2014 | Fontaine et al. | |
| 8,916,013 B2 | 12/2014 | Hong et al. | |
| 8,946,103 B2 | 2/2015 | Dejneka et al. | |
| 8,951,927 B2 | 2/2015 | Dejneka et al. | |
| 8,997,521 B2 | 4/2015 | Vehmas et al. | |
| 9,003,835 B2 | 4/2015 | Lock | |
| 9,039,886 B2 | 5/2015 | Gong et al. | |
| 9,073,291 B2 | 7/2015 | Bookbinder et al. | |
| 9,137,892 B2 | 9/2015 | Bando et al. | |
| 9,145,329 B2 | 9/2015 | Drake et al. | |
| 9,156,724 B2 | 10/2015 | Gross | |
| 9,296,638 B2 | 3/2016 | Lezzi et al. | |
| 9,434,633 B2* | 9/2016 | Bookbinder | C03B 17/02 |
| 9,478,449 B2 | 10/2016 | Vermont et al. | |
| 9,522,836 B2 | 12/2016 | Gulati et al. | |
| 9,552,836 B2 | 1/2017 | Ramakrishnan et al. | |
| 9,586,861 B2 | 3/2017 | Borrelli et al. | |
| 9,725,359 B2 | 8/2017 | Weber | |
| 9,761,828 B2 | 9/2017 | Dabich et al. | |
| 9,776,905 B2 | 10/2017 | Maschmeyer et al. | |
| 9,783,448 B2 | 10/2017 | Maschmeyer et al. | |
| 9,802,853 B2 | 10/2017 | Maschmeyer et al. | |
| 9,957,190 B2 | 5/2018 | Finkeldey et al. | |
| 9,975,801 B2* | 5/2018 | Maschmeyer | C03C 3/11 |
| 10,005,691 B2* | 6/2018 | Maschmeyer | C03B 29/16 |
| 10,077,204 B2* | 9/2018 | Maschmeyer | C03B 27/012 |
| 10,150,699 B2 | 12/2018 | Baum et al. | |
| 10,173,923 B2 | 1/2019 | Kawamoto et al. | |
| 10,195,778 B2 | 2/2019 | Wolf et al. | |
| 10,253,550 B1 | 4/2019 | Kim et al. | |
| 10,611,681 B2* | 4/2020 | Dejneka | C03C 3/097 |
| 11,028,013 B2* | 6/2021 | Ozeki | C03C 21/002 |
| 11,028,014 B2* | 6/2021 | Harris | H05K 5/0017 |
| 11,034,134 B2* | 6/2021 | Harris | C03C 17/02 |
| 11,059,744 B2* | 7/2021 | Oram | G06F 1/1656 |
| 11,078,102 B2* | 8/2021 | Cimo | C03B 33/0215 |
| 11,097,974 B2 | 8/2021 | Lezzi et al. | |
| 11,123,959 B2* | 9/2021 | Golyatin | C03C 17/02 |
| 11,254,607 B2* | 2/2022 | Harris | B32B 17/06 |
| 11,697,617 B2* | 7/2023 | Allan | C03C 27/06 428/428 |
| 2001/0007723 A1 | 7/2001 | Tokumoto | |
| 2002/0011481 A1 | 1/2002 | Melson et al. | |
| 2003/0037569 A1 | 2/2003 | Arbab et al. | |
| 2003/0177790 A1 | 9/2003 | Langsdorf et al. | |
| 2004/0107733 A1 | 6/2004 | Yashizawa | |
| 2005/0099618 A1 | 5/2005 | DiFoggio et al. | |
| 2005/0138892 A1 | 6/2005 | Misonou | |
| 2005/0266247 A1 | 12/2005 | Yoshizawa | |
| 2006/0054774 A1 | 3/2006 | Yassour et al. | |
| 2006/0121281 A1 | 6/2006 | Tamai et al. | |
| 2006/0179722 A1 | 8/2006 | Spindler | |
| 2006/0191292 A1 | 8/2006 | Carlomagno | |
| 2006/0219605 A1 | 10/2006 | Devitt | |
| 2006/0238100 A1 | 10/2006 | Miyata et al. | |
| 2007/0122580 A1* | 5/2007 | Krall, Jr. | C03B 27/0413 65/95 |
| 2007/0271957 A1 | 11/2007 | Nakamura et al. | |
| 2008/0314403 A1 | 12/2008 | Rebours | |
| 2009/0069163 A1 | 3/2009 | Beall | |
| 2009/0092472 A1 | 4/2009 | Luo et al. | |
| 2009/0220761 A1 | 9/2009 | Dejneka et al. | |
| 2010/0035038 A1 | 2/2010 | Barefoot et al. | |
| 2010/0084016 A1 | 4/2010 | Aitken et al. | |
| 2010/0130251 A1 | 5/2010 | Chu | |
| 2010/0162761 A1 | 7/2010 | Carney et al. | |
| 2010/0183767 A1 | 7/2010 | Noordam et al. | |
| 2010/0279067 A1 | 11/2010 | Sabia et al. | |
| 2010/0279068 A1 | 11/2010 | Cook et al. | |
| 2010/0300535 A1 | 12/2010 | Aitken et al. | |
| 2010/0300536 A1 | 12/2010 | Aitken et al. | |
| 2011/0014475 A1 | 1/2011 | Murata | |
| 2011/0045961 A1 | 2/2011 | Dejneka et al. | |
| 2011/0123832 A1 | 5/2011 | Matsumoto et al. | |
| 2011/0123833 A1 | 5/2011 | Endo et al. | |
| 2011/0200804 A1* | 8/2011 | Tomamoto | C03B 23/203 65/41 |
| 2011/0281093 A1 | 11/2011 | Gulati et al. | |
| 2011/0289971 A1 | 12/2011 | Brown et al. | |
| 2011/0289972 A1 | 12/2011 | Brown et al. | |
| 2011/0318555 A1* | 12/2011 | Bookbinder | C03C 3/085 428/428 |
| 2012/0052271 A1 | 3/2012 | Gomez et al. | |
| 2012/0144867 A1 | 6/2012 | Busch | |
| 2012/0145991 A1 | 6/2012 | Nam et al. | |
| 2012/0194974 A1* | 8/2012 | Weber | C03C 21/002 361/679.01 |
| 2012/0247063 A1 | 10/2012 | Grzybowski et al. | |
| 2012/0258250 A1 | 10/2012 | Rodgers | |
| 2012/0281279 A1 | 11/2012 | Goto et al. | |
| 2012/0291707 A1 | 11/2012 | Granneman | |
| 2012/0328843 A1 | 12/2012 | Cleary et al. | |
| 2013/0008500 A1 | 1/2013 | Lin et al. | |
| 2013/0019639 A1 | 1/2013 | Saito et al. | |
| 2013/0047673 A1 | 2/2013 | Lee et al. | |
| 2013/0052347 A1 | 2/2013 | Kuznetsov et al. | |
| 2013/0059120 A1 | 3/2013 | Shi et al. | |
| 2013/0065795 A1 | 3/2013 | Allbritton et al. | |
| 2013/0071666 A1 | 3/2013 | Komori et al. | |
| 2013/0122284 A1 | 5/2013 | Gross | |
| 2013/0122313 A1 | 5/2013 | Gross | |
| 2013/0199448 A1 | 8/2013 | Granneman et al. | |
| 2013/0224492 A1* | 8/2013 | Bookbinder | C03C 21/002 65/30.14 |
| 2013/0255314 A1 | 10/2013 | Allan et al. | |
| 2013/0291598 A1 | 11/2013 | Saito et al. | |
| 2013/0323444 A1 | 12/2013 | Ehemann et al. | |
| 2014/0005026 A1* | 1/2014 | Koike | C03C 3/093 501/66 |
| 2014/0010992 A1 | 1/2014 | Rendon Granados | |
| 2014/0026622 A1 | 1/2014 | Wang | |
| 2014/0050912 A1 | 2/2014 | Isono et al. | |
| 2014/0053605 A1 | 2/2014 | Mader | |
| 2014/0065401 A1 | 3/2014 | Donovan et al. | |
| 2014/0106172 A1 | 4/2014 | Dejneka et al. | |
| 2014/0113854 A1 | 4/2014 | Ni et al. | |
| 2014/0120279 A1 | 5/2014 | Demartino et al. | |
| 2014/0141217 A1* | 5/2014 | Gulati | C03C 3/087 428/375 |
| 2014/0162000 A1 | 6/2014 | Son et al. | |
| 2014/0178663 A1 | 6/2014 | Varshneya et al. | |
| 2014/0218867 A1 | 8/2014 | Kim et al. | |
| 2014/0230492 A1 | 8/2014 | Murata | |
| 2014/0242391 A1 | 8/2014 | Ono et al. | |
| 2014/0290310 A1 | 10/2014 | Green | |
| 2014/0331716 A1 | 11/2014 | Ahmed et al. | |
| 2014/0335331 A1* | 11/2014 | Ellison | B32B 17/00 65/53 |

(56) References Cited

U.S. PATENT DOCUMENTS

| | | |
|---|---|---|
| 2014/0352355 A1 | 12/2014 | Boudreau et al. |
| 2014/0356605 A1 | 12/2014 | Adib et al. |
| 2014/0370302 A1 | 12/2014 | Amin et al. |
| 2014/0370303 A1 | 12/2014 | Jin et al. |
| 2015/0027169 A1 | 1/2015 | Fredholm |
| 2015/0030827 A1 | 1/2015 | Gomez et al. |
| 2015/0030834 A1 | 1/2015 | Morey et al. |
| 2015/0031752 A1 | 1/2015 | Keil et al. |
| 2015/0037552 A1* | 2/2015 | Mauro ............... B32B 17/00 501/65 |
| 2015/0051061 A1* | 2/2015 | Kiczenski ........... C03C 3/091 501/69 |
| 2015/0052949 A1 | 2/2015 | Bayne et al. |
| 2015/0082834 A1 | 3/2015 | Vehmas et al. |
| 2015/0083200 A1 | 3/2015 | Hickman et al. |
| 2015/0096331 A1 | 4/2015 | Rantala et al. |
| 2015/0158276 A1 | 6/2015 | Thompson et al. |
| 2015/0158757 A1* | 6/2015 | Amma ............... C03B 27/044 428/220 |
| 2015/0166390 A1 | 6/2015 | Cha et al. |
| 2015/0166401 A1 | 6/2015 | Yamamoto |
| 2015/0175469 A1 | 6/2015 | Tabe |
| 2015/0202845 A1 | 7/2015 | Cherekdjian et al. |
| 2015/0218045 A1 | 8/2015 | Balcom et al. |
| 2015/0240038 A1 | 8/2015 | Macedo et al. |
| 2015/0246846 A1 | 9/2015 | Choju et al. |
| 2015/0251353 A1 | 9/2015 | Rodgers et al. |
| 2015/0251377 A1 | 9/2015 | Cleary et al. |
| 2015/0274015 A1 | 10/2015 | Wachinger et al. |
| 2015/0307385 A1 | 10/2015 | Klein et al. |
| 2015/0314571 A1 | 11/2015 | Cites et al. |
| 2015/0329406 A1 | 11/2015 | Kawamoto et al. |
| 2015/0343704 A1 | 12/2015 | Stahl et al. |
| 2015/0358021 A1* | 12/2015 | Limb ............... C03C 3/00 65/41 |
| 2015/0368153 A1 | 12/2015 | Pesansky et al. |
| 2016/0002103 A1 | 1/2016 | Wang et al. |
| 2016/0031739 A1 | 2/2016 | Lezzi et al. |
| 2016/0031741 A1 | 2/2016 | Maschmeyer et al. |
| 2016/0031742 A1 | 2/2016 | Maschmeyer et al. |
| 2016/0031743 A1 | 2/2016 | Maschmeyer et al. |
| 2016/0031744 A1 | 2/2016 | Maschmeyer et al. |
| 2016/0031752 A1 | 2/2016 | Maschmeyer et al. |
| 2016/0031753 A1 | 2/2016 | Maschmeyer et al. |
| 2016/0082705 A1 | 3/2016 | Fisher et al. |
| 2016/0168023 A1 | 6/2016 | Baum et al. |
| 2016/0194233 A1 | 7/2016 | Van Pelt |
| 2016/0194239 A1 | 7/2016 | Seto |
| 2016/0207819 A1 | 7/2016 | Cleary et al. |
| 2016/0250825 A1 | 9/2016 | Cleary et al. |
| 2016/0250982 A1 | 9/2016 | Fisher et al. |
| 2016/0281233 A1 | 9/2016 | Granneman et al. |
| 2016/0304352 A1 | 10/2016 | Ozyilmaz et al. |
| 2016/0326051 A1 | 11/2016 | Kim |
| 2017/0008377 A1 | 1/2017 | Fisher et al. |
| 2017/0022100 A1 | 1/2017 | Masters et al. |
| 2017/0072613 A2 | 3/2017 | Bracha et al. |
| 2017/0113440 A1 | 4/2017 | Rickerl et al. |
| 2017/0158543 A1 | 6/2017 | Metz et al. |
| 2017/0174564 A1* | 6/2017 | Cleary ............... C03C 3/087 |
| 2017/0197870 A1 | 7/2017 | Finkeldey et al. |
| 2017/0226007 A1 | 8/2017 | Garner et al. |
| 2017/0233287 A1 | 8/2017 | Li et al. |
| 2017/0297308 A1* | 10/2017 | Golyatin ........... C03B 17/02 |
| 2017/0355640 A1* | 12/2017 | Oram ............... C03C 4/18 |
| 2017/0361574 A1* | 12/2017 | Kiczenski ........... B32B 17/06 |
| 2018/0210308 A1 | 7/2018 | Lam et al. |
| 2018/0304588 A1* | 10/2018 | Harris ............... B32B 17/06 |
| 2019/0022979 A1 | 1/2019 | Luzzato et al. |
| 2019/0030861 A1* | 1/2019 | Bellman ............ C03B 17/02 |
| 2019/0047893 A1* | 2/2019 | Gross ............... C03B 27/0413 |
| 2019/0160787 A1 | 5/2019 | Bartlow et al. |
| 2019/0161402 A1 | 5/2019 | Harris et al. |
| 2019/0227357 A1 | 7/2019 | Williams et al. |
| 2019/0270284 A1 | 9/2019 | Couillard et al. |
| 2019/0391337 A1 | 12/2019 | Sato |

FOREIGN PATENT DOCUMENTS

| | | |
|---|---|---|
| AU | 05351/29 B2 | 3/1984 |
| CA | 1148742 A | 6/1983 |
| CA | 1176468 A | 10/1984 |
| CA | 2171323 A1 | 1/1996 |
| CN | 1208266 A | 2/1999 |
| CN | 1501892 A | 6/2004 |
| CN | 1693247 A | 11/2005 |
| CN | 1896020 A | 1/2007 |
| CN | 101312919 A | 11/2008 |
| CN | 101671112 A | 3/2010 |
| CN | 101774751 A | 7/2010 |
| CN | 101801869 A | 8/2010 |
| CN | 102112407 A | 6/2011 |
| CN | 102149649 A | 8/2011 |
| CN | 102503103 A | 6/2012 |
| CN | 102574726 A | 7/2012 |
| CN | 102659305 A | 9/2012 |
| CN | 102863146 A | 1/2013 |
| CN | 103201230 A | 7/2013 |
| CN | 103253857 A | 8/2013 |
| CN | 103319082 A | 9/2013 |
| CN | 103359934 A | 10/2013 |
| CN | 103534216 A | 1/2014 |
| CN | 103781733 A | 5/2014 |
| CN | 103827051 A | 5/2014 |
| CN | 104103385 A | 10/2014 |
| CN | 104144877 A | 11/2014 |
| CN | 104211288 A | 12/2014 |
| CN | 104260569 A | 1/2015 |
| CN | 104295448 A | 1/2015 |
| CN | 104310773 A | 1/2015 |
| CN | 104355530 A | 2/2015 |
| CN | 104364213 A | 2/2015 |
| CN | 104379532 A | 2/2015 |
| CN | 104428262 A | 3/2015 |
| CN | 104479282 A | 4/2015 |
| CN | 104520249 A | 4/2015 |
| CN | 104541233 A | 4/2015 |
| CN | 104583141 A | 4/2015 |
| CN | 104619622 A | 5/2015 |
| CN | 104619662 A | 5/2015 |
| CN | 104781201 A | 7/2015 |
| CN | 205275454 U | 6/2016 |
| CN | 105980147 A | 9/2016 |
| CN | 106045283 A | 10/2016 |
| CN | 206970472 U | 2/2018 |
| DE | 2233057 A1 | 3/1973 |
| EP | 0173418 A2 | 3/1986 |
| EP | 0413254 A1 | 2/1991 |
| EP | 0426363 A2 | 5/1991 |
| EP | 0441804 A1 | 8/1991 |
| EP | 0882681 A1 | 12/1998 |
| EP | 1215039 A2 | 6/2002 |
| EP | 1245545 A1 | 10/2002 |
| EP | 1380550 A1 | 1/2004 |
| EP | 1414762 A1 | 5/2004 |
| EP | 1533282 A1 | 5/2005 |
| EP | 1925952 A1 | 5/2008 |
| EP | 2543644 A2 | 1/2013 |
| EP | 2782753 A1 | 10/2014 |
| EP | 2819965 A2 | 1/2015 |
| EP | 2853517 A1 | 4/2015 |
| EP | 2876092 A1 | 5/2015 |
| FR | 2326386 A1 | 4/1977 |
| FR | 2936794 A1 | 4/2010 |
| GB | 0996423 A | 6/1965 |
| GB | 1026770 A | 4/1966 |
| GB | 1103192 A | 2/1968 |
| GB | 1112781 A | 5/1968 |
| GB | 1160284 A | 8/1969 |
| GB | 1253681 A | 11/1971 |
| GB | 1282720 A | 7/1972 |
| GB | 1289488 A | 9/1972 |

(56) References Cited

FOREIGN PATENT DOCUMENTS

| | | |
|---|---|---|
| GB | 2232978 A | 1/1991 |
| IN | 202420 | 5/2005 |
| IN | 200803022 | 8/2008 |
| IN | 201404365 | 2/2015 |
| IN | 201407444 | 4/2015 |
| JP | 51-103920 A | 9/1976 |
| JP | 55-104935 A | 8/1980 |
| JP | 56-155030 A | 12/1981 |
| JP | 56-155031 A | 12/1981 |
| JP | 57-067035 A | 4/1982 |
| JP | 57-067036 A | 4/1982 |
| JP | 58-088132 A | 5/1983 |
| JP | 58-091042 A | 5/1983 |
| JP | 59-008626 A | 1/1984 |
| JP | 59-008627 A | 1/1984 |
| JP | 59-008628 A | 1/1984 |
| JP | 59-008629 A | 1/1984 |
| JP | 59-008630 A | 1/1984 |
| JP | 59-008631 A | 1/1984 |
| JP | 59-057923 A | 4/1984 |
| JP | 60-171245 A | 9/1985 |
| JP | 61-072637 A | 4/1986 |
| JP | 61-141756 | 6/1986 |
| JP | 62-036030 A | 2/1987 |
| JP | 63-270330 A | 11/1988 |
| JP | 02-102436 A | 4/1990 |
| JP | 02-175624 A | 7/1990 |
| JP | 03-045526 A | 2/1991 |
| JP | 03-271127 A | 12/1991 |
| JP | 05-098626 A | 4/1993 |
| JP | 05-098627 A | 4/1993 |
| JP | 05-098628 A | 4/1993 |
| JP | 05-098629 A | 4/1993 |
| JP | 05-098630 A | 4/1993 |
| JP | 05-098631 A | 4/1993 |
| JP | 05-330835 A | 12/1993 |
| JP | 06-236030 A | 8/1994 |
| JP | 06-336533 A | 12/1994 |
| JP | 07-089739 A | 4/1995 |
| JP | 07-809739 A | 4/1995 |
| JP | 07-157322 A | 6/1995 |
| JP | 07-267664 A | 10/1995 |
| JP | 09-278468 A | 10/1997 |
| JP | 09-301732 A | 11/1997 |
| JP | 11-199257 A | 7/1999 |
| JP | 11-310430 A | 11/1999 |
| JP | 2000-072463 A | 3/2000 |
| JP | 2000-103632 A | 4/2000 |
| JP | 2000-172202 A | 6/2000 |
| JP | 2000-327355 A | 11/2000 |
| JP | 2001-002434 A | 1/2001 |
| JP | 2001-180967 A | 7/2001 |
| JP | 2001-307662 A | 11/2001 |
| JP | 2001-348245 A | 12/2001 |
| JP | 2003-040635 A | 2/2003 |
| JP | 2003-137603 A | 5/2003 |
| JP | 2003-261344 A | 9/2003 |
| JP | 2003-321255 A | 11/2003 |
| JP | 2003-342030 A | 12/2003 |
| JP | 2004-091311 A | 3/2004 |
| JP | 2004-115358 A | 4/2004 |
| JP | 3804115 B2 | 8/2006 |
| JP | 2006-298691 A | 11/2006 |
| JP | 2007-191319 A | 8/2007 |
| JP | 2007-261850 A | 10/2007 |
| JP | 2008-282863 A | 11/2008 |
| JP | 4397196 B2 | 1/2010 |
| JP | 4438126 B2 | 3/2010 |
| JP | 4557606 B2 | 10/2010 |
| JP | 4642107 B2 | 3/2011 |
| JP | 4722371 B2 | 7/2011 |
| JP | 4951838 B2 | 6/2012 |
| JP | 2012-232882 A | 11/2012 |
| JP | 2013-177253 A | 9/2013 |
| JP | 5334005 B2 | 11/2013 |
| JP | 2014-001121 A | 1/2014 |
| JP | 2014-073952 A | 4/2014 |
| JP | 2014-521586 A | 8/2014 |
| JP | 2014-166938 A | 9/2014 |
| JP | 2014-523389 A | 9/2014 |
| JP | 5614607 B2 | 10/2014 |
| JP | 5622069 B2 | 11/2014 |
| JP | 2015-006650 A | 1/2015 |
| JP | 2015-034123 A | 2/2015 |
| JP | 2015-054790 A | 3/2015 |
| JP | 2015-061808 A | 4/2015 |
| JP | 2015-086080 A | 5/2015 |
| JP | 5714701 B2 | 5/2015 |
| JP | 2015-112929 A | 6/2015 |
| JP | 2015-151329 A | 8/2015 |
| JP | 2015-163574 A | 9/2015 |
| KR | 10-0218143 B1 | 9/1999 |
| KR | 10-2002-0061567 A | 7/2002 |
| KR | 10-0690381 B1 | 3/2007 |
| KR | 10-0909835 B1 | 7/2009 |
| KR | 10-0918577 B1 | 9/2009 |
| KR | 10-0937889 B1 | 1/2010 |
| KR | 10-1000677 B1 | 12/2010 |
| KR | 10-1032825 B1 | 5/2011 |
| KR | 10-2011-0087774 A | 8/2011 |
| KR | 10-2011-0106629 A | 9/2011 |
| KR | 10-2011-0112503 A | 10/2011 |
| KR | 10-1093947 B1 | 12/2011 |
| KR | 10-1120262 B1 | 3/2012 |
| KR | 10-2012-0051220 A | 5/2012 |
| KR | 10-2012-0070450 A | 6/2012 |
| KR | 10-2013-0024484 A | 3/2013 |
| KR | 10-1248380 B1 | 3/2013 |
| KR | 10-1286131 B1 | 7/2013 |
| KR | 10-1413626 B1 | 8/2014 |
| KR | 2014-0095564 A | 8/2014 |
| KR | 10-2014-0110364 A | 9/2014 |
| KR | 10-2014-0135846 A | 11/2014 |
| KR | 2015-0002816 A | 1/2015 |
| KR | 2015-0013166 A | 2/2015 |
| KR | 10-2015-0051166 A | 5/2015 |
| KR | 10-2015-0129302 A | 11/2015 |
| KR | 10-2015-0129703 A | 11/2015 |
| KR | 2015-0129703 A | 11/2015 |
| RU | 2151750 C1 | 6/2000 |
| RU | 2199496 C2 | 2/2003 |
| RU | 2237621 C1 | 10/2004 |
| RU | 2299184 C1 | 5/2007 |
| RU | 2464243 C1 | 10/2012 |
| RU | 254731 A1 | 3/2013 |
| SU | 443845 A1 | 9/1974 |
| SU | 537960 A1 | 12/1976 |
| SU | 548188 A1 | 9/1982 |
| SU | 1098916 A1 | 6/1984 |
| SU | 1655920 A1 | 6/1991 |
| TW | 201111317 A | 4/2011 |
| TW | 201119967 A | 6/2011 |
| TW | I393686 B | 4/2013 |
| TW | 201343590 A | 11/2013 |
| TW | 201343591 A | 11/2013 |
| TW | 201418174 A | 5/2014 |
| TW | 201509858 A | 3/2015 |
| TW | 201609589 A | 3/2016 |
| TW | 201623168 A | 7/2016 |
| WO | 90/03337 A1 | 4/1990 |
| WO | 99/44952 A1 | 9/1999 |
| WO | 01/16040 A1 | 3/2001 |
| WO | 01/34531 A1 | 5/2001 |
| WO | 02/16277 A1 | 2/2002 |
| WO | 03/14035 A1 | 2/2003 |
| WO | 2006/083902 A1 | 8/2006 |
| WO | 2006/110376 A1 | 10/2006 |
| WO | 2008/020509 A1 | 2/2008 |
| WO | 2008/143999 A1 | 11/2008 |
| WO | 2008/147558 A1 | 12/2008 |
| WO | 2010/076903 A1 | 7/2010 |
| WO | 2011/122678 A1 | 10/2011 |
| WO | 2012/082709 A1 | 6/2012 |
| WO | 2012/125857 A1 | 9/2012 |

(56) References Cited

FOREIGN PATENT DOCUMENTS

| | | | |
|---|---|---|---|
| WO | 2012/142629 | A1 | 10/2012 |
| WO | 2013/001841 | A1 | 1/2013 |
| WO | 2013/016157 | A1 | 1/2013 |
| WO | 2013/078039 | A1 | 5/2013 |
| WO | 2013/130665 | A2 | 9/2013 |
| WO | 2013/130700 | A1 | 9/2013 |
| WO | 2014/024583 | A1 | 2/2014 |
| WO | 2014/030682 | A1 | 2/2014 |
| WO | 2014/060108 | A2 | 4/2014 |
| WO | 2014/139147 | A1 | 9/2014 |
| WO | 2014/182641 | A1 | 11/2014 |
| WO | 2014/182776 | A1 | 11/2014 |
| WO | 2014/201315 | A1 | 12/2014 |
| WO | 2015/031148 | A1 | 3/2015 |
| WO | 2015/031594 | A2 | 3/2015 |
| WO | 2015/033562 | A1 | 3/2015 |
| WO | 2015/057552 | A2 | 4/2015 |
| WO | 2015/088010 | A1 | 6/2015 |
| WO | 2015/125584 | A1 | 8/2015 |
| WO | 2015/156262 | A1 | 10/2015 |
| WO | 2016/019171 | A1 | 2/2016 |
| WO | 2016/037793 | A1 | 3/2016 |
| WO | 2016/057590 | A1 | 4/2016 |
| WO | 2016/094262 | A1 | 6/2016 |
| WO | 2016/183059 | A1 | 11/2016 |
| WO | 2017/019837 | A1 | 2/2017 |
| WO | 2017/020041 | A1 | 2/2017 |
| WO | 2017/066243 | A1 | 4/2017 |
| WO | 2017/071911 | A1 | 5/2017 |
| WO | 2017/079540 | A1 | 5/2017 |
| WO | 2017/139552 | A1 | 8/2017 |
| WO | 2018/136384 | A1 | 7/2018 |
| WO | 2018/136388 | A1 | 7/2018 |
| WO | 2021/025981 | A1 | 2/2021 |

OTHER PUBLICATIONS

Timoshenko et al; "Theory of Elasticity"; 2nd Ed; p. 146. Mcgraw-Hill Book Co., New York, 1951.

To, Q.D., et al., "Failure analysis of tempered glass structures with pin-loaded joints," Engineering Failure Analysis, vol. 14, Issue 5, Jul. 2007, pp. 841-850.

Tomlinson, R., G. Calvert, and A. Conway, "A Photoelastic Investigation Into Spontaneous Glass Fracture", Proceedings of the XIth International Congress and Exposition, (Jun. 2008) 8 pgs.

Varughese, Binoy et al., "Effect of fictive temperature on mechanical strength of soda-lime glasses," Journal of Non-Crystalline Solids, vol. 241, 1998, pp. 134-139.

Walrafen, G. E. et al., "Raman investigation of optical fibers under high tensile stress," Journal of Applied Physics, vol. 52, No. 4, Apr. 1981, pp. 2832-2836.

Wang et al.; "Glass and Hot Extrusion by ME Module for 3D Additive Manufacturing"; IEEE, 2016; pp. 1167-1171.

Wang, Fei et al., "Pressure Raman effects and internal stress in network glasses," Physical Review B, vol. 71, 2005, 32 pages.

Weissmann, Rand D. Durkop, "A Novel Method for Measuring Stresses in Flat Glass", XV International Congress on Glass Leningrad 1898, Proceeding 3b, O. V. Mazurin, ed., pp. 217-220.

WO-2016037793-A1—Bib Dta (Year: 2016).

Yamane, Masayuki, "Chapter 3: Thermal Processing," Glass Engineering Handbook, Asakura Publishing Co. Ltd., Jul. 1999, pp. 410-417.

Young Modulus of the elements; Wolfram Research Inc.; http://periodictable.com/Properties/A/YoungModulus.v.html; printed Mar. 7, 2019 (Year: 2019).

Yue, Y.Z. et al., "Determination of the fictive temperature for a hyperquenched glass," Chemical Physics Letters, vol. 357, Issues 1-2, May 3, 2002, pp. 20-24.

Zaccaria et al; "Thermal Healing of Realistic Flaws in Glass"; J. Mater. Civ. Eng 2016, 28(2); pp. 04015127-1-04015127-9.

Zaman, F. D. et al., "Cooling of a Plate with General Boundary Conditions," International Journal of Mathematics and Mathematical Sciences, vol. 23, No. 7, 2000, pp. 477-485.

Zhi-hai, L., "Development status and trend of tempered glass," Glass, Apr. 30, 2004, pp. 49-52 (Orignal Document Only ).

Deschamps, T. et al., "Soda-lime silicate glass under hydrostatic pressure and indentation: a micro-Raman study," Journal of Physics: Condensed Matter, vol. 23, 2011, 7 pages.

Donald, I. W., "Review: Methods for improving the mechanical properties of oxide glasses," Journal of Materials Science, vol. 24, 1989, pp. 4177-4208.

Dr.Tallant, T.A. Michalske, and W.L. Smith, "The effects of tensile stress on the Raman spectrum of silica glass," J. Non-Cryst. Solids, 106 380-383 (1988).

Electronic Cooling Editors, "The Thermal Conductivity of Gases", Design, Materials, Adhesives, Substrates, No. 3, Technical Data, Test & Measurement, vol. 4, Gases, Thermal Conductivity, Sep. 1, 1998, 2 pages.

Europtec; "Themal Tempering" ; Europtec GmbH, DIC, Jun. 11, 2014; www.europtec.de.

Everall, Neil et al., "Optimizing Depth Resolution in Confocal Raman Microscopy: A Comparison of Metallurgical, Dry Corrected, and Oil Immersion Objectives," Applied Sprectroscopy, vol. 61, No. 3, 2007, pp. 251-259.

Everall, Neil J., "Confocal Raman Microscopy: Why the Depth Resolution and Spatial Accuracy Can Be Much Worse then You Think," Applied Spectroscopy, vol. 54, No. 10, 2000, pp. 1515-1520.

Fotheringham, Dr. Ulrich, "Lecture 7: Viscoelasticity III—Dynamic Testing," IMI-NFG's MITT Course on Relaxation Processes in Glass and Polymers Lecture 7, 2010, 19 slides.

Fotheringham, Dr. Ulrich, "Lecture 8: Viscoelasticity IV—Important Application of Pre-Stressing," IMI-NFG's MITT Course on Relaxation Processes in Glass and Polymers Lecture 8, 2010, 12 slides.

Freiman, S. W., "Chapter 2: Fracture Mechanics of Glass," In "Glass: Science and Technology," vol. 5, Elasticity and Strength in Glasses, Academic Press, Inc., May 28, 1980, pp. 21-78.

Frick, B. et al., "The Microscopic Basis of the Glass Transition in Polymers from Neutron Scattering Studies," Science, vol. 267, Mar. 31, 1995, pp. 1939-1945.

Galeener, Frank L., "Raman and ESR Studies of the Thermal History of Amorphous $SiO_2$," Journal of Non-Crystalline Solids, vol. 71, 1985, pp. 373-386.

Gammelgaard et al., "Graphene transport properties upon exposure to PMMA processing and heat treatments", 2D Materials, vol. 1, 2014, 035005, 12 pages.

Gang, Zhang Ming, "Manufacturing and Properties of Glass Used in Construction," Guangdong Golden Glass Technologies Ltd, Dec. 27, 2002, 11 pages.

Gardon, Robert, "Calculation of Temperature Distributions in Glass Plates Undergoing Heat-Treatment," Journal of the American Ceramic Society, vol. 41, No. 6, Jun. 1958, pp. 200-209.

Gardon, Robert, "Chapter 5: Thermal Tempering of Glass," In "Glass: Science and Technology," vol. 5, Elasticity and Strength in Glasses, Academic Press, Inc., May 28, 1980, pp. 145-216.

Gardon, Robert, "Tempering Glass with Modulated Cooling Schedules," Journal of the American Ceramic Society, vol. 71, No. 10, Oct. 1988, pp. 876-878.

Glass Unlimited "AGC Technical Data Sheet Planibel". ; Nov. 2011 (Year: 2011).

Glass, Jill et al., "Processing and Properties of Ion Exchanged Glasses," Glass and Optical Materials Division Fall Meeting, Nov. 6-12, 2004, Cape Canaveral, FL, 33 slides.

Glass, S. J. et al., "Stressed Glass Technology for Actuators and Removable Barrier Applications," Sandia Report SAND2007-4106, Sandia National Laboratories, Jul. 2007, 18 pages.

Gomez, Sinue et al., "69.2: Designing Strong Glass for Mobile Devices," SID Symposium Digest of Technical Papers, vol. 40, No. 1, Jan. 2009, pp. 1045-1048.

Gross et al. "A glass with high crack initiation load: Role of fictive temperature-independent mechanical properties"; Journal of Non-crystalline Solids 355 (2009) pp. 563-568 (Year: 2009).

(56) References Cited

OTHER PUBLICATIONS

Gross, T.M., "Deformation and cracking behavior of glasses indented with diamond tips of various sharpness," Journal of Non-Crystalline Solids, vol. 358, Issue 24, Dec. 12, 2012, pp. 3445-3452.
Guillemet, C., "Annealing and Tempering of Glass," Journal of Non-Crystalline Solids, vol. 123, 1990, pp. 415-426.
Gulati, "Frangibility of Tempered Soda-Lime Glass Sheet," pp. 13-15 in Glass Performance Days, 1997.
Guo, Xiaoju et al. "Unified approach for determining the enthalpic fictive temperature of glasses with arbitrary thermal history" Journal of Non-Crystalline Solids, vol. 357, 2011, pp. 3230-3236.
Gupta, Prabhat K et al., "The laboratory glass transition," The Journal of Chemical Physics, vol. 126, 2007, 9 pages.
Gupta, Prabhat, "Landscape Approach to Glass Transition and Relaxation: Basic Concepts (contd.)," IMI-NFG's MITT Course on Relaxation Processes in Glass Lecture 18, Mar. 25, 2010, 23 slides.
Gupta, Prabhat, "Landscape Approach to Glass Transition and Relaxation: Four lectures on 'The Landscape Approach,'" IMI-NFG's MITT Course on Relaxation Processes in Glass Lecture 17, Mar. 23, 2010, 28 slides.
Gupta, Prabhat, "Landscape Approach to Glass Transition and Relaxation: Liquid to Glass Transition," IMI-NFG's MITT Course on Relaxation Processes in Glass Lecture 19, Mar. 30, 2010, 25 slides.
Gupta, Prabhat, "Landscape Approach to Glass Transition and Relaxation: Relaxation in the glassy state," IMI-NFG's Min Course on Relaxation Processes in Glass Lecture 20, Apr. 1, 2010, 20 slides.
Gy, Rene, "Ion exchange for glass strengthening," Materials Science and Engineering B, vol. 149, 2008, pp. 159-165.
Hara, Morihisa et al., "Vickers Hardness of Toughened Sheet Glass," Reports of the Research Laboratory, Asahi Glass Co., Ltd., vol. 12, No. 2, 1962, pp. 99-104.
Hibino, Yoshinori et al., "Raman study on silica optical fibers subjected to high tensile stress," Applied Physics Letters, vol. 47, No. 8, Oct. 15, 1985, pp. 812-814.
Hodge, Ian M., "Physical Aging in Polymer Glasses," Science, vol. 267, , No. 5206, Mar. 31, 1995, pp. 1945-1947.
Hrma et al; "Thermal Healing of Cracks in Glass"; Journal of Non-Crystalline Solids; vol. 102, (1988); pp. 88-94.
Huang, Liping et al., "Polyamorphic transitions in vitreous B2O3 under pressure," Journal of Physics: Condensed Matter, vol. 20, 2008, 8 pages.
Hubert, Mathieu, "Lecture 9: Annealing and tempering," IMI-NFG Course on Processing in Glass—Lecture 9, Feb. 19, 2015, 72 slides.
Hutchins, J. and R. Harrington, "Glass", Kirk-Othmer Encyclopedia of Chemical Technology, 2nd Edition, 10 pp. 533-604.
International Search Report and Written Opinion of the International Searching Authority; PCT/US2020/062128; dated Mar. 15, 2021; 9 pages; European Patent Office.
International Search Report and Written Opinion of the International Searching Authority; PCT/US2020/062145; mailed on Mar. 16, 2021, 11 pages; Korean Patent Office.
Jain, Himanshu, "Electrical Relaxation—Topic 1: Quasi-free ion transport," IMI-NFG's MITI Course on Relaxation Processes in Glass Lecture 23, Advanced Vitreous State, The Properties of Glass: Dielectric Properties—Lecture 1, 2010, 28 slides.
Jain, Himanshu, "Electrical Relaxation—Topic 3: Nearly constant loss—second universality," IMI-NFG's Min Course on Relaxation Processes in Glass Lecture 25, Advanced Vitreous State, The Properties of Glass: Dielectric Properties—Lecture 3, 2010, 24 slides.
John Klein et al: "Additive Manufacturing of optically Transparent Glass", 3D Printing and Additive Manufactureing, vol. 2, No. 3, Aug. 19, 2015 (Aug. 19, 2015), pp. 92-105, XP055328426.
Kassir-Bodon, Assia et al., "Raman Mapping of the Indentation-Induced Densification of a Soda-Lime-Silicate Glass," International Journal of Applied Glass Science, vol. 3, No. 1, 2012, pp. 29-35.
Kiefer, Werner et al., "Method for Thermal Prestressing of Glass," Strength of Inorganic Glass, Plenum Press, New York, 1985, pp. 501-511.

Kishii, Toru, "Surface Stress Meters Utilising the Optical Waveguide Effect of Chemically Tempered Glasses," Optics and Lasers in Engineering, vol. 4, 1983, pp. 25-38.
Kistler, S. S., "Stresses in Glass Produced by Nonuniform Exchange of Monovalent Ions," Journal of the American Ceramic Society, vol. 45, No. 2, Feb. 1962, pp. 59-68.
Koike et al.—Sub-critical crack growth rate of soda-lime-silicate glass and less brittle glass as a function of fictive temperature; Journal of Non-Crystalline Solids vol. 353 Issue 27 pp. 2675-2680; Jun. 2007 (Year: 2007).
Lathabai, Srinivasarao et al., "Fracture mechanics model for sub-threshold indentation flaws: Part 1—Equilibrium fracture," Journal of Materials Science, vol. 26, 1991, pp. 2157-2168.
Lee, Hoikwan et al., "Glass Thickness and Fragmentation Behavior in Stressed Glasses," New Journal of Glass and Ceramics, vol. 2, 2012, pp. 138-143.
Li, Hong et al., "Effect of Fictive Temperature on Dynamic Fatigue Behavior of Silica and Soda-Lime Glasses," Journal of the American Ceramic Society, vol. 78, No. 5, 1995, pp. 1393-1396.
Lin et al., "Graphene annealing: how clean can it be?", Nano Lett., vol. 12, Issue 1, 2012, pp. 414-419.
Loucks, Dr. Roger, "Lecture 15: The Tool-Narayanaswamy-Moynihan Equation Part II and DSC," IMI-NFG's MITT Course on Relaxation Processes in Glass Lecture 15, Mar. 9, 2010, 33 slides.
Loucks, Dr. Roger, "Lecture 16: The Tool-Narayanaswamy-Moynihan Equation Part II and DSC," IMI-NFG's MITT on Relaxation Processes in Glass Lecture 16, Mar. 11, 2010, 32 slides.
Luo et al., "Competing Indentation Deformation Mechanisms in Glass Using Different Strengthening Methods", Frontiers in Materials, vol. 3, No. 52, 2016, 11 pages.
Luo et al; "Additive Manufacturing of Glass for Optical Applications"; Proc. of SPIE, vol. 9738, 2016; pp. 97380Y-1-97380Y-9.
Markovsky, Alex et al., "An Efficient and Stable Algorithm for Calculating Fictive Temperatures," Communications of the American Ceramic Society, Apr. 1984, 2 pages.
Martin, Dr. Steve, "Lecture 10: Thermodynamic Functions," IMI-NFG's MITT Course on Relaxation Processes in Glass Lecture 10, 2010, 25 slides.
Martin, Dr. Steve, "Lecture 11: Thermodynamics in the Glass Transition Region," IMI-NFG's MITT Course on Relaxation Processes in Glass Lecture 11, 2010, 22 slides.
Martin, Dr. Steve, "Lecture 12: The Glass Transition as a Kinetic Transition," IMI-NFG's Min Course on Relaxation Processes in Glass Lecture 12, 2010, 21 slides.
Martin, Dr. Steve, "Lecture 9: Thermodynamic Concepts and the Law of Thermodynamics," IMI-NFG's Min Course on Relaxation Processes in Glass Lecture 9, 2010, 32 slides.
Massen, Claire P. et al., "Power-law distributions for the areas of the basins of attraction on a potential energy landscape," Physical Review E, The American Physical Society, vol. 75, 2007, 4 pages.
Mauricio-Iglesias, M. et al., "Raman depth-profiling characterization of a migrant diffusion in a polymer," Journal of Membrane Science, vol. 375, 2011, pp. 165-171.
McGlinchy, Timothy B., "Energy Efficient Tripe IG Automation EEE (Triple-E)," DE-EE0000167, GED Integrated Solutions, Feb. 28, 2013, 45 pages.
Mcmaster, Ronald A., "Flat Glass Tempering—How II Works," Glass Industry, Jun. 1989, pp. 10-15.
McMaster, Ronald A., "Fundamentals of Tempered Glass," Proceedings of the 49th Conference on Glass Problems: Ceramic Engineering and Science Proceedings, vol. 10, Issue 3/4, 1989, pp. 193-206.
Mcmaster, Ronald A_ et al., "Annealed and Tempered Glass," Engineered Materials Handbook, vol. 4, Ceramics and Glasses, 1991, 9 pages.
Merriam-Webster Online Dictionary, "Coextensive", 2009, 1 page. Retrieved from: https://www.merriam-webster.com/dictionary/coextensive.
Mikowski, A. et al., "Statistical analysis of threshold load for radial crack nucleation by Vickers indentation in commercial soda-lime silica glass," Journal of Non-Crystalline Solids, vol. 352, 2006, pp. 3544-3549.

(56) References Cited

OTHER PUBLICATIONS

Mognato, Ennio et al., "Thermally toughened safety glass," Glass on Web, Last Reviewed: Jul. 2011, 9 pages, http://www.glassonweb.com/articles/article/727/.
Morey; "The Effect of Boric Oxide On the Devitrification of the Soda-Lime-Silica Glasses. The Quaternary System, Na20—CaO—B2O3—SiO2"; Journal of the Amercian Ceramic Society; vol. 15, Issue 9; pp. 457-475 (1932).
Moynihan, C. T. et al., "Structural Relaxation in Vitreous Materials," Annals of the New York Academic of Sciences, vol. 279, Oct. 1976, pp. 15-35.
Narayanaswamy, 0. S. et al., "Calculation of Residual Stresses in Glass," Journal of the American Ceramic Society, vol. 52, No. 10, Oct. 1969, pp. 554-558.
Narayanaswamy, O. S., "Stress and Structural Relaxation in Tempering Glass," Journal of the American Ceramic Society, vol. 61, No. 3-4, Mar.-Apr. 1978, pp. 146-152.
Oakley, David R., "Crack branching in float glass subjected to biaxial loading," Journal of Non-Crystalline Solids, vol. 196, 1996, pp. 139-143.
Ohlberg et al; "Thermal Stress Calculations Based on a Linear Viscoelastic Deviatoric Response and a Fictive Temperature Component for the Volumetric Response," Journal of Non-Crystalline Solids, 14 280-286 (1974).
Paschel, Richard, "History of the Safety Glazing Certification Council," Safety Glazing Certification Council, Date Unknown, 11 pages.
Properties of Soda-Lime Silica Float Glass Technical Bulletin; NSG; Group; Pilkington North America , Inc. Jan. 14, 2013 (Year: 2013).
Ray, N. H. et al., "Increasing the strength of glass by treatment in molten salts," Physics and Chemistry of Glasses, vol. 8, No. 1, Feb. 1967, pp. 30-34.
Rekhson, S. M., "Chapter 1: Viscoelasticity of Glass," In "Glass: Science and Technology," vol. 3, 1986, 117 pages.
Rekson, S. M., "Structural Relaxation and Shear Stresses in the Glass-Transition Region," Soviet Journal of Glass Physics and Chemistry, 1975, pp. 417-421.
Sastry, Srikanth, "The relationship between fragility, configurational entropy and the potential energy landscape of glass-forming liquids," Nature, vol. 409, Jan. 11, 2001, pp. 164-167.
Scherer, George W., "Use of the Adam-Gibbs Equation in the Analysis of Structural Relaxation," Journal of the American Ceramic Society, vol. 67, No. 7, Jul. 1984, pp. 504-511.
Sciortino, Francesco, "Potential energy landscape description of supercooled liquids and glasses," Journal of Statistical Mechanics: Theory and Experiment, May 31, 2005, 35 pages.
Sehgal, Jeetendra et al., "A New Low-Brittleness Glass in the Soda-Lime-Silica Glass Family," Journal of the American Ceramic Society, vol. 81, No. 9, Sep. 1998, pp. 2485-2488.
Setsuro, Ito et al., "Processing Technical Books to the Glass High-Functions," Chapter 3: Sections 2.5, 3, 3.1, 3.2 & 3.3, Science & Technology Co., Ltd., Sep. 27, 2012, pp. 58-65.
Sglavo, V., A. Prezzi, M. Alessandrini, "Processing of Glasses with Engineered Stress Profiles," Journal of Non-Crystalline Solids, 344 (2004), 73-78.
Shelby "Introduction to Glass Science and Technology"; The Royal Chemical Society, 2nd Edition, 2005; p. 193.
Shimodaira, N. et al., "Raman spectra of fluorine-doped silica glasses with various fictive temperatures," Journal of Applied Physics, vol. 91, No. 6, Mar. 15, 2002, pp. 3522-3525.
Shinkai, Norihiko et al., "Indentation Fracture of Tempered Glasses," Reports of the Research Laboratory, Asahi Glass Co., Ltd., vol. 23, No. 2, 1973, pp. 83-99.
Shouyuan, Zhai et al., "Influence of Temperature and Time on Glass Strength During Chemical Tempering," Journal of Shangdong Institute of Light Industry (Natural Science Edition), Feb. 1996, 3 pages.
Shutov, A. I. et al., "Prediction of the Character of Tempered Glass Fracture," Glass and Ceramics, vol. 55, Nos. 1-2, 1998, pp. 8-10.
Soules, Thomas F. et al., "Finite-Element Calculation of Stresses in Glass Parts Undergoing Viscous Relaxation," Journal of the American Ceramic Society, vol. 70, No. 2, Feb. 1987, pp. 90-95.
Southard, J. C., "The Thermal Properties of Crystalline and Glassy Boron Trioxide," Journal of the American Chemical Society, vol. 63, No. 11, Nov. 1941, pp. 3147-3150.
Spaght, Monroe E_ et al., "Studies on Glass_ VIII. The Coefficient of Thermal Expansion of Boron Trioxide," Journal of Physical Chemistry, vol. 38, No. 1, 1934, pp. 103-110.
Specialty Glass Products, "Soda Lime/AR/Flint Glass"; http://www.sgpinc.com/sodalime.htm accessed Aug. 11, 2016.
Stillinger, Frank H. et al., "Packing Structures and Transitions in Liquids and Solids," Science, New Series, vol. 225, No. 4666, Sep. 7, 1984, pp. 983-989.
Stillinger, Frank H., "A Topographic View of Supercooled Liquids and Glass Formation," Science, New Series, vol. 267, No. 5206, Mar. 31, 1995, pp. 1935-1939.
Tallant, D. R. et al., "The Effects of Tensile Stress on the Raman Spectrum of the Silica Glass," Journal of Non-Crystalline Solids, vol. 106, 1988, pp. 380-383.
"Effects of ion exchange on the Young's modulus of glass"; John D. Mackenzie, J. Wakaki; Journal of Non-crystalline Solids; vols. 38-39, Part 1 May-Jun. 1980, pp. 385-390 (Year: 1980).
Aben, H. et al., "2.7 Stresses Due to Heterogeneities," Photoelasticity of Glass, Springer-Verlag, New York, 1993, 260 pages.
Acloque, P., "Influence of Strain-Systems in Glass upon the Course of its Fracture," Proceedings of the 4th International Glass Congress, vol. 6, 1965, pp. 279-291.
Acloque, Paul, "Comparison Between Heat-Transfer Conditions and Setting Up of Strain in Glass During Heat-Treatment," Journal of the American Ceramic Society, vol. 44, No. 7, Jul. 1961, pp. 364-373.
Agarwal, Anand et al., "A simple IR spectroscopic method for determining fictive temperature of silica glasses," Journal of Non-Crystalline Solids, vol. 185, 1995, pp. 191-198.
Agarwal, Anand et al., "Determination of Fictive Temperature of Soda-Lime Silicate Glass," Journal of the American Ceramic Society, vol. 78, No. 3, Mar. 1995, pp. 827-829.
Akeyoshi, K. et al., "Mechanical Properties of Tempered Glass," Proceedings of the 7th International Glass Congress, vol. 14, 1965, pp. 80-85.
Alexiades, V. et al., "The New Way/Glaston Problem," 28th Annual Workshop on Mathematical Problems in Industry, University of Delaware, Jun. 2012, 30 slides.
Argon, A. S., "Chapter 3: Inelastic Deformation and Fracture in Oxide, Metallic, and Polymeric Glasses," In, "Glass: Science and Technology," vol. 5, Elasticity and Strength in Glass, Academic Press, May 28, 1980, pp. 79-132.
Aronen, Antti et al., "Tempering of Thin Glass," Glasstec 2012: Engineered Transparency, Oct. 25-26, 2012, pp. 145-153.
ASTM C1499-09, "Standard Test Method for Monotonic Equibiaxial Flexural Strength of Advanced Ceramics at Ambient Temperature", 2013, 14 pages.
ASTM C158-02, "Standard Test Methods for Strength of Glass by Flexure" (Determination of Modulus of Rupture), 2012, 9 pages.
Author Unknown, "Application Note AN 527: Depth profiling of complex samples using confocal Raman microscopy," Bruker Optics Inc., 2012, 3 pages.
Author Unknown, "Architectural ERH2 ," Architectural Glass Systems, Glasstech, Inc., 2011, 2 pages.
Author Unknown, "Architectural FCH2(Trademark) ," Architectural Glass Systems, Glasstech, Inc., 2011, 2 pages.
Author Unknown, "Corning(Registered) Gorilla(Trademark) Glass," Corning Incorporated, 2009, 2 pages.
Author Unknown, "Glass Strengthening Methods," Abrisa Technologies, Apr. 2015, 2 pages.
Author Unknown, "Heat Treated Glass for Architectural Glazing," Glass Technical Document: TD-138, PPG Glass Technology, PPG Industries, Inc., Nov. 2011, 8 pages.
Author Unknown, "Introducing—Glasstech CRB-S.TM. 1900 for Solar Parabolic Shapes," Solar Glass Systems, Glasstech, Inc., Date Unknown, 1 page, Retrieved Jul. 1, 2015.

(56) References Cited

OTHER PUBLICATIONS

Author Unknown, "New Way Air Bearings," 28th Annual Workshop on Mathematical Problems in Industry, University of Delaware, Jun. 2012, 16 slides.
Author Unknown, "Products, Glazing Techniques and Maintenance Section 4: GGF Dalasheet for the Quality of Thermally Toughened Soda Lime Silicate Safety Glass for Building," Glass and Glazing Federation, Aug. 2009, 12 pages.
Author Unknown, "Schott Technical Glasses—Physical and technical properties," Schott North America, Inc., Feb. 2010, 44 pages.
Author Unknown, "scratch and dig numbers," Sizes, Inc., Last Revised: Jun. 24, 2010, 5 pages, http:/fwww.sizes.com/units/scratch_and_dig.him.
Author Unknown, "Solar FCH-S(Trademark) ," Solar Glass Systems, Glasstech, Inc., 2011, 2 pages.
Author Unknown, "Standard Specification for Heat-Strengthened and Fully Tempered Flat Glass," Designation: C 1048-12, ASTM International Standard, 2015, 7 pages.
Author Unknown, "Standard Specification for Heat-Treated Flat Glass—Kind HS, Kind FT Coated and Uncoated Glass," Designation: C 1048-4, ASTM International Standard, 2009, 7 pages.
Author Unknown, "Subject Index," Date Unknown, pp. 277-282.
Author Unknown, "Thermal Tempering," EuropTec GmbH, Nov. 6, 2014, 2 pages.
Author Unknown, "Unsteady Heat Transfer—HT3: Experimental Studies of Thermal Diffusivities and Heat Transfer Coefficients," Date Unknown, 27 slides.
Baldwin, K. J. et al., "Confocal Raman Microspectroscopy through a Planar Interface," Applied Spectroscopy, vol. 55, No. 5, 2001, pp. 517-524.
Barr, Jonathan W., "The Tempering Process," Cardinal Waxachachie Tempering Seminar, Mar. 26, 2008, 36 slides.
Barr, Jonathan, "The Glass Tempering Handbook—Understanding the Glass Tempering Process," Self Published, 2015, 52 pages, http://www.lambertgtservices.co.uk/book/TheGlassTemperingHandbook.pdf.
Barsom, John M., "Fracture of Tempered Glass," Journal of the American Ceramic Society, vol. 51, No. 2, Feb. 1968, pp. 75-78.
Bartholomew, Roger F. et al., "Chapter 6: Chemical Strengthening of Glass," In "Glass: Science and Technology," vol. 5, Elasticity and Strength in Glass, Academic Press, May 28, 1980, pp. 217-270.
Bird, R. D., W. E. Stewart, and E. N. Lightfoot, Transport Phenomena—Chapter 11: The Equations of Change for Nonisothermal Systems, Wiley, (1960) pp. 349-373.
Bird, R. D., W. E. Stewart, and E. N. Lightfoot, Transport Phenomena—Chapter 3: The Equations of Change for Isothermal Systems, Wiley, (1960) pp. 75-113.
Boaz, Prem, "Tempering Very Thin Glass—What Radio Waves Mean for the Glass Industry," USGlass Magazine, vol. 45, Issue 3, Mar. 2010, 5 pages.
Boaz, Prem, "Thin glass processing with radio wave assist," Glass on Web, Last Reviewed: Jan. 2013, 6 pages, http://www.glassonweb.com/articles/article/561/.
Boguslavskll, I. A., "Studying the Nature of the Super-Strength of Glasses Strengthened by the Thermophysical Method," Glass and Ceramics, vol. 21, No. 10, Oct. 1964, pp. 562-567.
Brown, Angus M., "Nonlinear regression analysis of data using a spreadsheet," Application Note, ISC, Oct. 2001, pp. 58-59.
Chen, et al., "Nanopatterned Graphene on a Polymer Substrate by a Direct Peel-off Technique", ACS Appl. Mater. Interfaces, vol. 7, Issue 10, 2015, pp. 5938-5943.
Chinese Patent Application No. 201880077846.1, Office Action dated Mar. 2, 2022, 15 pages (7 pages of English Translation and 8 pages of Original Document), Chinese Patent Office.
Choi et al., "Influence of removing PMMA residues on surface of CVD graphene using a contact-mode atomic force Microscope" RSC Adv., vol. 7, 2017, pp. 6943-6949.
CN101671112A English Translation Performed by USPTO Translations Service Center Apr. 2017.
Conradt, Reinhard, "I. Fragility and its Relation to Other Glass Properties," IMI-NFG's MITT Course on Relaxation Processes in Glass Lecture 21, Apr. 6-8, 2010, 61 slides.
Conradt, Reinhard, "II. Networks," IIMI-NFG's Min Course on Relaxation Processes in Glass Lecture 22, Apr. 6-8, 2010, 61 slides.
Conway, Jr., Joseph C. et al., "Use of Crack Branching Data for Measuring Near-Surface Residual Stresses in empered Glass," Journal of the American Ceramic Society, vol. 72, No. 9, Sep. 1989, pp. 1584-1587.
Cox, Dr. Chris, "Lecture 3: Complex exponential function, Fourier and Laplace transforms," IMI-NFG's MITT Course on Relaxation Processes in Glass and Polymers Lecture 3, 2010, 25 slides.
Cox, Dr. Chris, "Lecture 4: Differential Equations," IMI-NFG's Min Course on Relaxation Processes in Glass and Polymers Lecture 4, 2010, 24 slides.
Daudeville, Laurent et al., "Thermal Tempering Simulation of Glass Plates: Inner and Edge Residual Stresses," Journal of Thermal Stresses, vol. 21, 1998, pp. 667-689.
"Energy Curable Resins", https://www.allnex.com/en/technologies/energy-curable-resins; retrieved on Oct. 10, 2022.

\* cited by examiner

GLASS LAMINATES HAVING DETERMINED STRESS PROFILES AND METHODS OF MAKING THE SAME

CROSS-REFERENCE TO RELATED APPLICATIONS

This application claims the benefit of priority under 35 U.S.C. § 371 of International Application No. PCT/US2020/027913, filed on Apr. 13, 2020, which claims the benefit of priority under 35 U.S.C. § 119 of U.S. Provisional Application Ser. No. 62/837,411 filed on Apr. 23, 2019 the content of each of which is relied upon and incorporated herein by reference in its entirety.

FIELD

The present specification generally relates to glass articles and, more particularly, to laminated glass articles including a plurality of glass layers and methods for forming the same.

TECHNICAL BACKGROUND

Glass articles can be used in a wide variety of products, including, for example, auto-glazing, architectural panels, appliances, and cover glasses (e.g., for touch-screen devices such as smartphones, tablets, laptop computers, and monitors). Relatively large flaws can be introduced into the surfaces of the glass articles during use. For example, when a smartphone is dropped onto a rough surface, such as asphalt, the local indention caused by contact with sharp features of the rough surface can cause flaws as deep as about 300 μm in the surface of the cover glass.

Accordingly, a need exists for glass articles with improved resistance to breakage caused by deep flaws, improved mechanical reliability, and improved drop performance.

SUMMARY

According to various aspects disclosed herein, a laminated glass article comprises a core layer comprising a core glass composition having an average core coefficient of thermal expansion ($CTE_{core}$) and a clad layer directly adjacent to the core layer and comprising a clad glass composition having an average clad coefficient of thermal expansion ($CTE_{clad}$) that is less than the $CTE_{core}$ such that the clad layer is in compression and the core layer is in tension. A compressive stress of the clad layer increases with increasing distance from the outer surface of the clad layer, transitions to a minimum tensile stress as a step-change at an interface region between the core layer and the clad layer, and a magnitude of tensile stress increases continuously from the step-change to a maximum tensile stress in the core layer.

Another aspect includes the laminated glass article of the previous aspect, wherein a surface compressive stress of the clad layer is at least 200 MPa.

Another aspect includes the laminated glass article of any of the previous aspects, wherein a surface compressive stress of the clad layer is at least 250 MPa.

Another aspect includes the laminated glass article of any of the previous aspects, wherein the laminated glass article comprises a depth of compression of up to 50 μm.

According to other aspects disclosed herein, a method of preparing a glass article comprises laminating at least one core layer and at least one clad layer to form a laminated glass article, the at least one core layer comprising a core glass composition having an average core coefficient of thermal expansion ($CTE_{core}$) and the at least one clad layer comprising a clad glass composition having an average clad coefficient of thermal expansion ($CTE_{clad}$) that is less than the $CTE_{core}$ such that the at least one clad layer is in compression and the at least one core layer is in tension, heating the laminated glass article to a first temperature that is from 50° C. to 200° C. greater than a glass transition temperature $T_g$ of the laminated glass article, equilibrating the laminated glass article at the first temperature for a predetermined period of time, and quenching the laminated glass article to a second temperature below a strain point of the laminated glass article.

Another aspect includes the method of the previous aspect, wherein the first temperature is greater than or equal to 750° C. and less than or equal to 900° C.

Another aspect includes the method of any of the previous aspects, wherein the second temperature is 25° C.±10° C.

Another aspect includes the method of any of the previous aspects, further comprising subjecting the laminated glass article to an ion exchange treatment.

Another aspect includes the method of any of the previous aspects, wherein after quenching, a compressive stress of the clad layer increases with increasing distance from the outer surface of the clad layer, transitions to a minimum tensile stress as a step-change at an interface region between the core layer and the clad layer, and a magnitude of tensile stress increases continuously from the step-change to a maximum tensile stress in the core layer.

Another aspect includes the method of any of the previous aspects, wherein after quenching, a surface compressive stress of the clad layer is at least 200 MPa.

According to aspects disclosed herein, a laminated glass article comprises a core layer comprising a core glass composition having an average core coefficient of thermal expansion ($CTE_{core}$) and a clad layer directly adjacent to the core layer and comprising a clad glass composition and having an average clad coefficient of thermal expansion ($CTE_{clad}$) that is less than the $CTE_{core}$ such that the clad layer is in compression and the core layer is in tension. A compressive stress of the clad layer decreases with increasing distance from the outer surface of the clad layer, transitions to a minimum tensile stress as a step-change at an interface region between the core layer and the clad layer, and a tensile stress increases continuously from the step-change to a maximum tensile stress in the core layer.

Another aspect includes the glass article of the previous aspect, wherein a surface compressive stress of the clad layer is at least 500 MPa.

Another aspect includes the glass article of any of the previous two aspects, wherein the minimum tensile stress is at least 50 MPa.

Another aspect includes the glass article of any of the previous three aspects, wherein the compressive stress decreases with increasing distance from the outer surface of the clad layer in according to a non-linear relationship.

Another aspect includes the glass article of any of the previous four aspects, wherein the tensile stress increases to a maximum tensile stress according to a non-linear relationship.

According to other aspects disclosed herein, a method of preparing a glass article comprises laminating at least one core layer and at least one clad layer to form a laminated glass article, the at least one core layer comprising an ion-exchangeable core glass composition having an average core coefficient of thermal expansion ($CTE_{core}$) and the at least one clad layer comprising an ion-exchangeable clad glass composition having an average clad coefficient of thermal expansion ($CTE_{clad}$) that is less than the $CTE_{core}$ such that the at least one clad layer is in compression and the at least one core layer is in tension; and contacting the laminated glass article with an ion exchange bath comprising a first ion source and a second ion source. After the contacting, the laminated glass article has a depth of compression (DOC) of greater than or equal to 50 µm.

Another aspect includes the method of the previous aspect, wherein after the contacting, the laminated glass article has a DOC of greater than or equal to 70 µm.

Another aspect includes the method of any of the previous two aspects, wherein after the contacting, the laminated glass article has a DOC of greater than or equal to 100 µm.

Another aspect includes the method of any of the previous three aspects, wherein after the contacting, the laminated glass article has a DOC of greater than or equal to 200 µm.

Another aspect includes the method of any of the previous four aspects, wherein the ion exchange bath is a first ion exchange bath, the method further comprising contacting the laminated glass article with a second ion exchange bath comprising at least one additional ion source. Alternatively, the aspect may include the method of any of the previous four aspects, wherein contacting the laminated glass article with an ion exchange bath comprises contacting the laminated glass article with a first ion exchange bath comprising the first ion source and subsequently contacting the laminated glass article with a second ion exchange bath comprising the second ion source.

Another aspect includes the method of any of the previous five aspects, wherein the first ion source comprises a source of sodium ions, and the second ion source comprises a source of potassium ions.

Another aspect includes the method of any of the previous seven aspects, further comprising, prior to contacting the laminated glass article with the ion exchange bath: heating the laminated glass article to a first temperature that is from 50° C. to 200° C. greater than a glass transition temperature $T_g$ of the laminated glass article; equilibrating the laminated glass article at the first temperature for a predetermined period of time; and quenching the laminated glass article to a second temperature.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
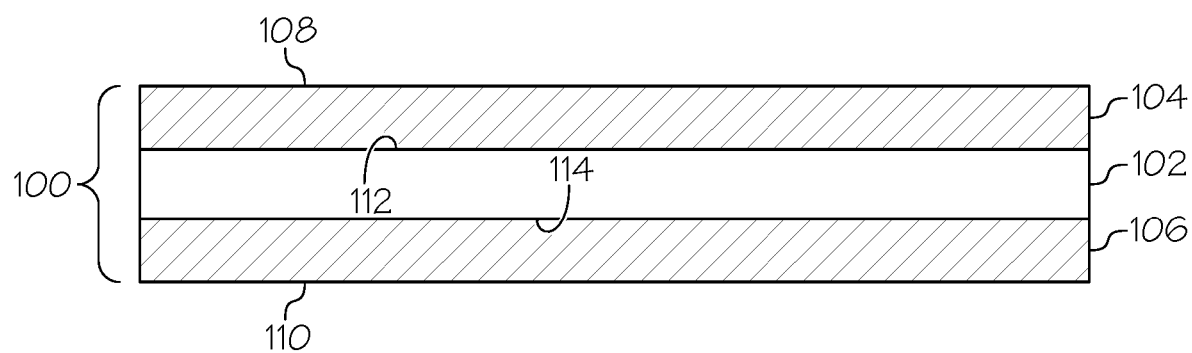
FIG. 1 is a cross-sectional view of a glass article in accordance with one or more embodiments shown and described herein.

Reference will now be made in detail to various embodiments, examples of which are illustrated in the accompanying drawings. Whenever possible, the same reference numerals will be used throughout the drawings to refer to the same or like parts.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The drawings shall be interpreted as illustrating one or more embodiments that are drawn to scale and/or one or more embodiments that are not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that can be formed by such values.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

As used herein, the term "average coefficient of thermal expansion," or "average CTE," refers to the average coefficient of linear thermal expansion of a given material or layer between 0° C. and 300° C. As used herein, the term "coefficient of thermal expansion," or "CTE," refers to the average coefficient of thermal expansion unless otherwise indicated.

In various embodiments, one or more properties of the glass article are improved by use of a post-forming fictivation process. As used herein, "fictivation" refers to imposing a specified fictive temperature or thermal history on a glass through appropriate heat treatment. As used herein, the term "fictive temperature" refers to the temperature which reflects the structural contribution to the enthalpy of the glass. The fictive temperature of a glass may be determined by calorimetric methods, as described by Xiaoju Guo et al. in "Unified approach for determining the enthalpic fictive temperature of glasses with arbitrary thermal history," (Journal of Non-Crystalline Solids 357 (2011) pp. 3230-3236), the contents of which are incorporated herein by reference in their entirety. In the glasses described herein, the fictive temperature is from 50° C. to 200° C. greater than the glass transition temperature (Tg) of the glass article.

Glass Laminates

In various embodiments, a glass article comprises at least a first layer and a second layer. For example, the first layer comprises a core layer, and the second layer comprises one or more clad layers adjacent to the core layer. The first layer and/or the second layer are glass layers comprising a glass material, a ceramic material, a glass-ceramic material, or a combination thereof. In some embodiments, the first layer and/or the second layer are transparent glass layers.

The core layer has an average core CTE (core CTE or $CTE_{core}$), and the clad layer has an average clad CTE (clad CTE or $CTE_{clad}$). For example, the core layer is formed from a first glass composition with the core CTE and the clad layer is formed from a second glass composition with the clad CTE. The core CTE is greater than the clad CTE such that the core layer is in tension and the clad layer is in compression, prior to any heat treatment or ion exchange. In some embodiments, a stress profile of the glass laminate comprises a compressive stress peak disposed within the clad layer (e.g., between an outer surface of the clad layer and an inner surface of the clad layer). Additionally, or alternatively, the stress profile of the glass laminate may comprise a continuously increasing region disposed within the clad layer (e.g., the compressive stress increases between the outer surface of the clad layer and the depth of compression, excluding any compressive stress spike). In some embodiments, a compressive stress of the clad layer increases with increasing depth within the glass article to the interface between the clad layer and the core layer. In still other embodiments, a stress profile of the glass laminate comprises a compressive stress peak at the surface of the glass laminate and a compressive stress that continuously decreases with increasing depth within the glass article to the interface between the clad layer and the core layer.

FIG. 1 is a cross-sectional view of one embodiment of a glass article 100. The glass article 100 is a laminated sheet including a plurality of glass layers. In embodiments, the laminated sheet may be substantially planar, as shown in FIG. 1, or the laminated sheet may be non-planar. The glass article 100 comprises a core layer 102 disposed between a first clad layer 104 and a second clad layer 106. In some embodiments, the first clad layer 104 and the second clad layer 106 are exterior layers relative to the core layer 102, as shown in FIG. 1. For example, an outer surface 108 of the first clad layer 104 is an outer surface of the glass article 100 and/or an outer surface 100 of the second clad layer 106 is an outer surface of the glass article 100. In other embodiments, the first clad layer 104 and/or the second clad layer 106 are intermediate layers disposed between the core layer 102 and an exterior layer (not shown).

The core layer 102 comprises a first major surface and a second major surface opposite the first major surface. In some embodiments, the first clad layer 104 is fused to the first major surface of the core layer 102. Additionally or alternatively, the second clad layer 106 is fused to the second major surface of the core layer 102. In such embodiments, an interface 112 between the first clad layer 104 and the core layer 102 and/or an interface 114 between the second clad layer 106 and the core layer 102 are free of any bonding material such as, for example, an adhesive, a coating layer, or any non-glass material added or configured to adhere the respective clad layers to the core layer. Thus, the first clad layer 104 and/or the second clad layer 106 are fused directly to the core layer 102 and/or are directly adjacent to the core layer 102. In some embodiments, the glass article 100 includes one or more intermediate layers disposed between the core layer and the first clad layer and/or between the core layer and the second clad layer. For example, the intermediate layers may comprise intermediate glass layers and/or diffusion layers formed at the interface of the core layer and the clad layer. The diffusion layer can comprise a blended region comprising components of each layer adjacent to the diffusion layer (e.g., a blended region between two directly adjacent glass layers). In some embodiments, the glass article 100 comprises a glass-glass laminate in which the interfaces between directly adjacent glass layers are glass-glass interfaces.

In some embodiments, the core layer 102 comprises a first glass composition and first and/or second clad layers 104, 106 comprise a second glass composition that is different than the first glass composition. The first glass composition and the second glass composition are different from each other prior to chemically strengthening the glass article 100 as described herein. For example, in the embodiment shown in FIG. 1, the core layer 102 comprises the first glass composition and each of the first clad layer 104 and the second clad layer 106 comprises the second glass composition. In other embodiments, the first clad layer comprises the second glass composition and the second clad layer comprises a third glass composition that is different than the first glass composition and/or the second glass composition.

Figure 2:
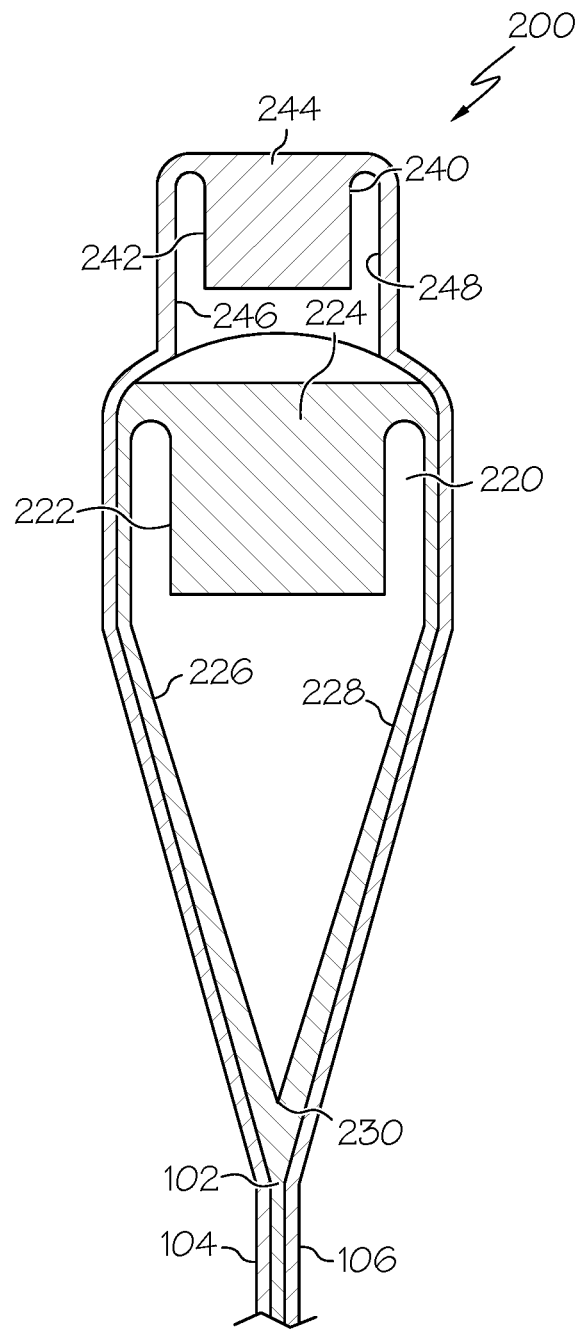
FIG. 2 is a cross-sectional view of an overflow distributor that can be used to form a glass article in accordance with one or more embodiments shown and described herein.

The glass article can be formed using a suitable process such as, for example, a fusion draw, down draw, slot draw, up draw, or float process. In some embodiments, the glass article 100 is formed using a fusion draw process. FIG. 2 is a cross-sectional view of an example embodiment of overflow distributor 200 that can be used to form a glass article such as, for example, the glass article 100.

The overflow distributor 200 can be configured as described in U.S. Pat. No. 4,214,886, which is incorporated by reference in its entirety. For example, the fusion draw apparatus 200 includes a lower overflow distributor 220 and an upper overflow distributor 240 positioned above the lower overflow distributor 220. The lower overflow distributor 220 includes a trough 222. A first glass composition 224 is melted and fed into the trough 222 in a viscous state. The first glass composition 224 forms the core layer 102 of the glass article 100 as further described below. The upper overflow distributor 240 includes a trough 242. A second glass composition 244 is melted and fed into the trough 242 in a viscous state. The second glass composition 244 forms first and second clad layers 104, 106 of the glass article 100 as further described below.

The first glass composition 224 overflows trough 222 and flows down opposing outer forming surfaces 226 and 228 of the lower overflow distributor 220. The outer forming surfaces 226 and 228 converge at a draw line 230. The separate streams of the first glass composition 224 flowing down respective outer forming surfaces 226 and 228 of the lower overflow distributor 220 converge at the draw line 230 where they are fused together to form the core layer 102 of the glass article 100.

The second glass composition 224 overflows the trough 242 and flows down opposing outer forming surfaces 246 and 248 of the upper overflow distributor 240. The second glass composition 244 is deflected outward by the upper overflow distributor 240 such that the second glass composition 244 flows around the lower overflow distributor 220 and contacts the first glass composition 224 flowing over the outer forming surfaces 226 and 228 of the lower overflow distributor 220. The separate streams of the second glass composition 244 are fused to the respective separate streams of the first glass composition 224 flowing down the respective outer forming surfaces 226 and 288 of the lower overflow distributor 220. Upon convergence of the streams of the first glass composition 224 at the draw line 230, the second glass composition 244 forms first and second clad layers 104, 106 of the glass article 100.

In some embodiments, the first glass composition 224 of the core layer 102 in the viscous state is contacted with the second glass composition 244 of the first and second clad layers 104, 106 in the viscous state to form the laminated sheet. In some of such embodiments, the laminated sheet is part of a glass ribbon traveling away from the draw line 230 of the lower overflow distributor 220, as shown in FIG. 2. The glass ribbon can be drawn away from the lower overflow distributor 220 by a suitable means including, for example, gravity and/or pulling rollers. The glass ribbon cools as it travels away from the lower overflow distributor 220. The glass ribbon is severed to separate the laminated sheet therefrom. Thus, the laminated sheet is cut from the glass ribbon. The glass ribbon can be severed using a suitable technique such as, for example, scoring, bending, thermally shocking, and/or laser cutting. In some embodiments, the glass article 100 comprises the laminated sheet as shown in FIG. 1. In other embodiments, the laminated sheet can be processed further (e.g., by cutting or molding) to form the glass article.

Although the glass article 100 is shown in FIG. 1 as including three layers, other embodiments are contemplated. For example, the glass article may have two, four, or more layers. Glass articles including two layers can be formed using two overflow distributors positioned such that the two layers are joined while traveling away from the respective draw lines of the overflow distributors or by using a single overflow distributor with a divided trough such that two glass compositions flow over opposing outer forming surfaces of the overflow distributor and converge at the draw line of the overflow distributor. Glass articles including four layers can be formed using additional overflow distributors and/or using overflow distributors with divided troughs. Thus, a glass article having a predetermined number of layers can be formed by modifying the overflow distributor accordingly.

Although the glass article 100 is shown in FIG. 1 as comprising a laminated sheet, other forms are contemplated. For example, the glass article may be in the form of a laminated tube comprising multiple tubular layers (e.g., formed by one or more annular orifices), and a partial cross-section of the laminated tube may have a laminated structure similar to that shown in FIG. 1. In other embodiments, the glass article may be a shaped glass article, such as may be formed by shaping or molding a laminated sheet.

In some embodiments, the glass article 100 has a thickness of at least about 0.05 mm, at least about 0.1 mm, at least about 0.2 mm, or at least about 0.3 mm Additionally or alternatively, the glass article 100 has a thickness of less than about 3 mm, less than about 2 mm, less than about 1.5 mm, less than about 1 mm, less than about 0.7 mm, or less than about 0.6 mm. In some embodiments, a ratio of a thickness of the core layer 102 to a thickness of the glass article 100 is at least about 0.5, at least about 0.7, at least about 0.8, at least about 0.85, at least about 0.9, or at least about 0.95. Additionally or alternatively, the ratio of the thickness of the core layer to the thickness of the glass article 100 is less than about 0.95, less than about 0.93, less than about 0.9, less than about 0.87, or less than about 0.85. In some embodiments, a thickness of the second layer (e.g., each of the first clad layer 104 and the second clad layer 106) is from about 0.01 mm to about 0.6 mm.

In some embodiments, the first glass composition and/or the second glass composition have a liquidus viscosity suitable for forming the glass article 100 using a fusion draw process as described herein. For example, the first glass composition of the core layer 102 may have a liquidus viscosity of at least about 100 kP, at least about 200 kP, or at least about 300 kP. Additionally or alternatively, the first glass composition comprises a liquidus viscosity of less than about 3000 kP, less than about 2500 kP, less than about 1000 kP, or less than about 800 kP. The second glass composition of the first and/or second clad layers 104 and 106 may have a liquidus viscosity of at least about 50 kP, at least about 100 kP, or at least about 200 kP. Additionally or alternatively, the second glass composition comprises a liquidus viscosity of less than about 3000 kP, less than about 2500 kP, less than about 1000 kP, or less than about 800 kP. The first glass composition can aid in carrying the second glass composition over the overflow distributor to form the second layer. Accordingly, the second glass composition can have a liquidus viscosity that is lower than generally considered suitable for forming a single layer sheet using a fusion draw process.

In various embodiments described herein, the glass article 100 is strengthened by a combination of mechanical strengthening and thermal tempering, or fictivation, and/or ion exchange. For example, the glass article 100 may have a CTE mismatch as described herein, and may be thermally tempered, or fictivated, to further improve the stress profile against deep flaws and improve Knoop and Vickers scratch performance. As another example, the glass article 100 may have a CTE mismatch as described herein, and may be ion exchanged to improve the stress profile against deep flaws.

Mechanical Strengthening

In various embodiments, the glass article 100 is mechanically strengthened. For example, the second glass composition forming the first and/or second clad layers 104, 106 may have a different CTE than the first glass composition forming the core layer 102. In particular, in some embodiments, the first and second clad layers 104, 106 may be formed from a glass composition having a lower CTE than the glass composition of the core layer 102. The CTE mismatch (i.e., the difference between the CTE of the first and second clad layers 104, 106 and the CTE of the core layer 102) results in the formation of compressive stress in the clad layers and tensile stress in the core layer upon cooling of the glass article 100. In various embodiments, each of the first and second clad layers, independently, can have a higher CTE, a lower CTE, or substantially the same CTE as the core layer. Surface compressive stresses tend to suppress existing surface flaws from developing into cracks. Higher CTE mismatch results in higher surface compression in the clad layer. Additionally, a thicker clad layer results in a deeper depth of compression (DOC). However, such higher surface compressive stress and deeper DOC also result in increasing tensile stress in the core layer. Accordingly, the various factors should be balance with one another as described herein.

In embodiments, the CTE of the core layer 102 and the CTE of the first and/or second clad layers 104, 106 differ by at least about $5 \times 10^{-7\circ}$ C.$^{-1}$, at least about $15 \times 10^{-7\circ}$ C.$^{-1}$, at least about $25 \times 10^{-7\circ}$ C.$^{-1}$, or at least about $30 \times 10^{-7\circ}$ C.$^{-1}$. Additionally or alternatively, the CTE of the core layer 102 and the CTE of the first and/or second clad layers 104, 106 differ by less than about $100 \times 10^{-7\circ}$ C.$^{-1}$, less than about $75 \times 10^{-7\circ}$ C.$^{-1}$, less than about $50 \times 10^{-7\circ}$ C.$^{-1}$, less than about $40 \times 10^{-7\circ}$ C.$^{-1}$, less than about $30 \times 10^{-7\circ}$ C.$^{-1}$, less than about $20 \times 10^{-7\circ}$ C.$^{-1}$, or less than about $10 \times 10^{-7\circ}$ C.$^{-1}$. For example, in some embodiments, the CTE of the core layer and the CTE of the first and/or second clad layers differ by about $5 \times 10^{7\circ}$ C.$^{-1}$ to about $30 \times 10^{-7\circ}$ C.$^{-1}$, or about $5 \times 10^{7\circ}$ C.$^{-1}$ to about $20 \times 10^{-7\circ}$ C.$^{-1}$. In some embodiments, the second glass composition of the first and/or second clad layer has a CTE of less than about $66 \times 10^{-7\circ}$ C.$^{-1}$, less than about $55 \times 10^{-7\circ}$ C.$^{-1}$, less than about $50 \times 10^{-7\circ}$ C.$^{-1}$, less than about $40 \times 10^{-7\circ}$ C.$^{-1}$, or less than about $35 \times 10_{-7}^{\circ}$ C.$^{-1}$. Additionally or alternatively, the second glass composition of the first and/or second clad layer has a CTE of at least about $10 \times 10^{-7\circ}$ C.$^{-1}$, at least about $15 \times 10^{-7\circ}$ C.$^{-1}$, at least about $25 \times 10^{-7\circ}$ C.$^{-1}$, or at least about $30 \times 10^{-7\circ}$ C.$^{-1}$. The first glass composition of the core layer may have a CTE of at least about $40 \times 10^{-7\circ}$ C.$^{-1}$, at least about $50 \times 10^{-7\circ}$ C.$^{-1}$, at least about $55 \times 10^{-7\circ}$ C.$^{-1}$, at least about $65 \times 10^{-7\circ}$ C.$^{-1}$, at least about $70 \times 10^{-7\circ}$ C.$^{-1}$, at least about $80 \times 10^{-7\circ}$ C.$^{-1}$, or at least about $90 \times 10^{-7\circ}$ C.$^{-1}$. Additionally or alternatively, the first glass composition of the core layer may have a CTE of less than about 120×10$^{-7}$ °C.$^{-1}$, less than about 110×10$^{-7}$ °C.$^{-1}$, less than about 100×10$^{-7}$ °C.$^{-1}$, less than about 90×10$^{-7}$ °C.$^{-1}$, less than about 75×10$^{-7}$ °C.$^{-1}$, or less than about 70×10$^{-7}$ °C.$^{-1}$.

Thermal Tempering

In various embodiments described herein, the glass article 100 is thermally tempered, or fictivated. In embodiments, the glass article 100 is heated to a first temperature that is from 50° C. to 200° C. greater than the glass transition temperature (T$_g$) of the clad layer, followed by equilibrating the glass article at the first temperature for a predetermined time period, and then quickly quenching the glass article to a second temperature below the lower strain point of the core layer or the clad layer. In some embodiments, the glass article is heated to a first temperature that is from 50° C. to 200° C. greater than the glass transition temperature (T$_g$) of the clad layer followed by equilibration at the first temperature and rapid quenching to a second temperature below the lower strain point of the clad layer or the core layer. In embodiments in which the first and second clad layers 104, 106 have different T$_g$s, the first temperature is greater than the higher T$_g$. In some embodiments, the first temperature is higher than the T$_g$ of the clad layer and less than the T$_g$ of the core layer. In other embodiments, the first temperature is higher than the T$_g$ of the clad layer and the T$_g$ of the core layer. In some embodiments, the first temperature is higher than the thickness weighted average T$_g$ of the clad layer and the core layer. In some embodiments, the glass article is heated to a first temperature that is greater than or equal to 750° C. and less than or equal to 900° C., or greater than or equal to 775° C. and less than or equal to 875° C., or even greater than or equal to 790° C. and less than or equal to 860° C. In some embodiments, the second temperature is less than the strain point of the clad layer and less than the strain point of the core layer. In other embodiments, the second temperature is less than the strain point of the clad layer and higher than the strain point of the core layer. In some embodiments, the second temperature is less than the thickness weighted average strain point of the clad layer and the core layer. In some embodiments, the glass is fast cooled from the first temperature to a second temperature which is about room temperature (25° C.±10° C.).

Figure 3:
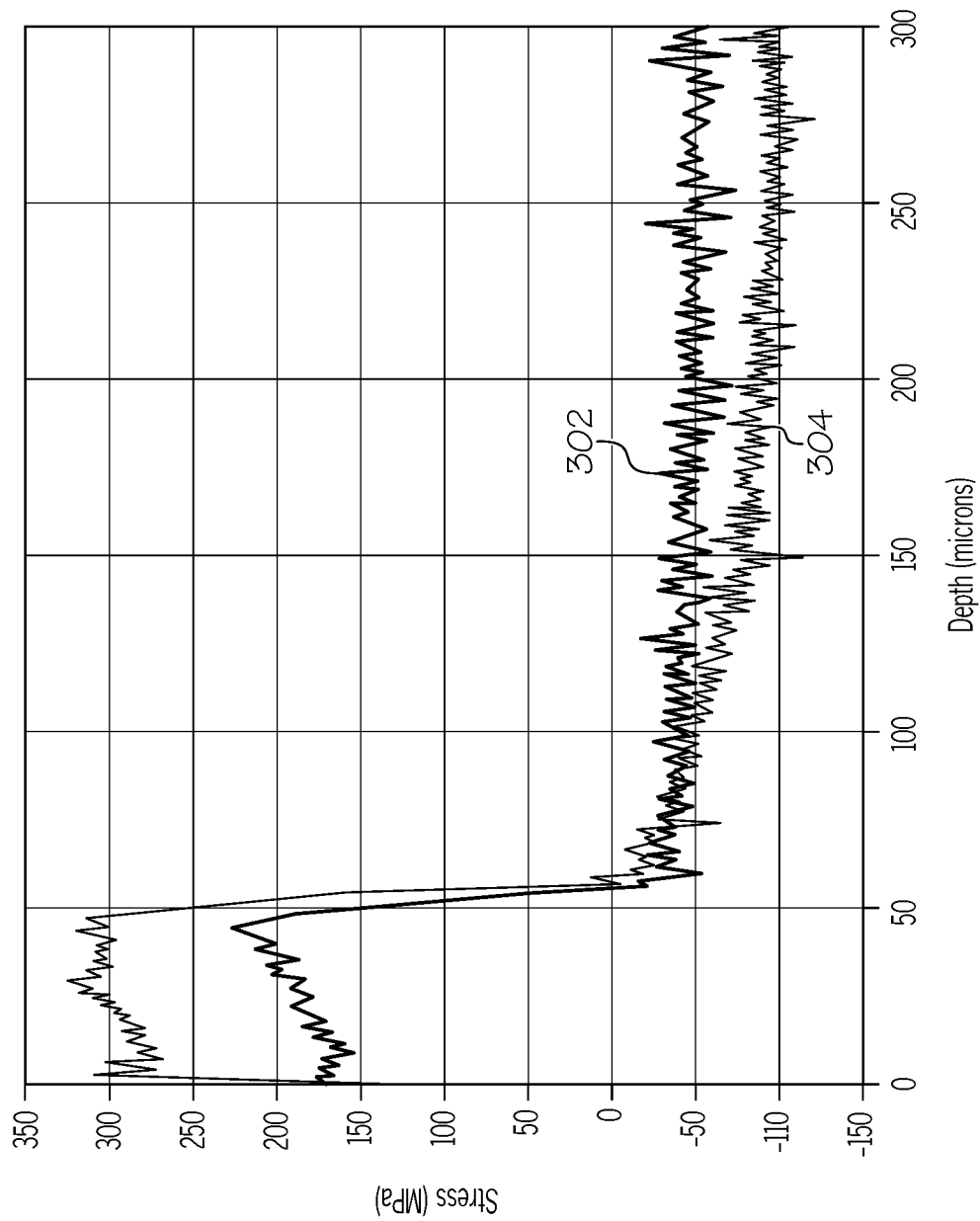
FIG. 3 is a plot of the stress profiles of an example embodiment and a comparative example in which stress is plotted on the y-axis and depth within the glass article is plotted on the x-axis.

FIG. 3 is a graphical illustration comparing an example mechanical stress profile 302 generated by CTE mismatch alone and an example combined thermal mechanical stress profile 304 generated by thermal tempering and CTE mismatch. As shown in FIG. 3, the positive stress corresponds to a compressive stress while negative stresses correspond to a tensile stress. For the mechanical stress profile 302 and the combined thermal mechanical stress profile 304, the heat transfer coefficient was 0.03. Each of the glass articles was laminated with a core/clad ratio of 4.0 and a clad thickness of 55 µm. The stress profiles are represented by the stress as a function of depth within the glass article 100. The depth within the glass article 100, given as the distance from an outer surface of the glass article 100, is plotted on the x-axis and the stress is plotted on the y-axis.

The stress profile of a glass article can be measured using any suitable technique including, for example, using a birefringence based measurement technique or a refracted near-field (RNF) technique. For example, stress measurements can be performed according to ASTM C1422 and ATSM C1279. The stress profile comprises the stress in the glass article 100 as a function of depth within the glass article. The depth within the glass article 100, given as the distance from an outer surface of the glass article, is plotted on the x-axis, and the stress is plotted on the y-axis. The depth within the glass article may be referred to herein as depth of compression (DOC). Compressive stress is shown on the positive x-axis, and tensile stress is shown on the negative y-axis. However, the values of compressive and tensile stresses described herein refer to the absolute values of the stresses, or the magnitude of the stress. Thus, tensile stresses are given herein as positive values as opposed to negative values.

Referring to the mechanical stress profile 302, the compressive region (e.g., the clad layer) has a thickness of about 50 µm and a first compressive stress of about 150 MPa. Mechanical stress 302 is a step function. Thus, the compressive stress increases continuously from the surface compressive stress throughout the compressive region, and the stress transitions to the maximum tensile stress as a step-change at an interface region between the clad layer and the core layer).

Referring to the combined thermal mechanical stress profile 304, the compressive region extends to a depth of layer (DOL) of about 50 µm and has a surface compressive stress of at least 200 MPa. In various embodiments, the surface compressive stress is greater than 250 MPa. The compressive stress increases continuously with increasing distance from the outer surface of the clad layer from the surface compressive stress throughout the clad layer, transitions to the minimum tensile stress as a step-change at an interface region between the core layer and the clad layer, and a magnitude of tensile stress increases continuously from the step-change to the maximum tensile stress within the core layer. Thus, in contrast to the mechanical stress profile 302, the combined thermal mechanical stress profile 304 has a region of continuously increasing tensile stress in the core layer to the mid-point of the core layer.

Moreover, as can be seen in the combined thermal mechanical stress profile 304, the thermal tempering introduces a parabolic shape to the profile, particularly in the core layer, which may sometimes be referred to as the tensile region. Such a shape in the stress profile indicates that a flaw extending into the core layer will not peak until deeper into the depth of the glass article.

It will be recognized that FIG. 3 illustrates only a portion of each of the stress profiles through a portion of the thickness of the glass article (e.g., through one clad layer and a portion of the core layer). For a symmetrical glass article, the stress profile through the remaining portion of the thickness of the glass article is a mirror image of the illustrated portions of the stress profiles in FIG. 3.

The retained strength of a glass article can be determined based on the stress profile of the glass article. For example, the retained strength is determined by forming a flaw extending from a surface of the glass article to a specified depth and then determining the strength of the glass article after formation of the flaw. The strength is flexural strength of the glass article determined using, for example, a ring-on-ring test method (e.g., as described in ASTM C1499-09), a ball-on-ring test method, a three-point bend test method, a four-point bend test method, or another suitable method or technique. Such a retained strength determination can be conducted using a fracture mechanics simulation based on the stress profile of the glass article.

Figure 4:
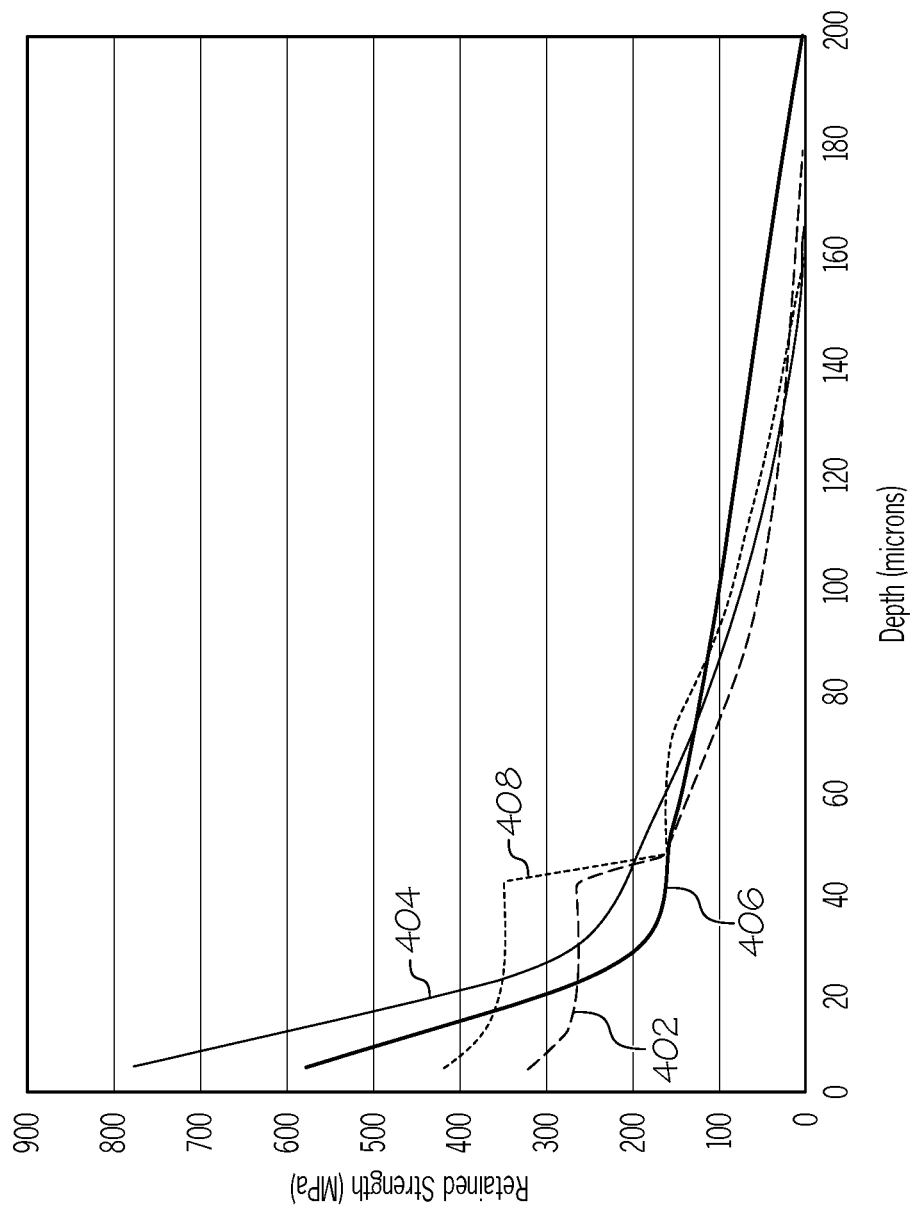
FIG. 4 is a plot of the retained strength profile of an example embodiment and three comparative examples in which retained strength is plotted on the y-axis and flaw size is plotted on the x-axis.

FIG. 4 is a graphical illustration comparing example retained strength profiles corresponding to stress profiles generated by mechanical strengthening alone, thermal tempering alone, and a combination of mechanical strengthening and thermal tempering. The retained strength profiles are represented by the retained strength as a function of flaw size. The flaw size, given as the distance from an outer surface of the glass article to the point to which the flaw extends, is plotted on the x-axis, and the retained strength is plotted on the y-axis.

The retained strength profiles 402, 404, 406 and 408 were generated using a fracture mechanics simulation. The mechanical retained strength profile 402 was based on a laminated glass article including CTE mismatch (e.g., mechanically strengthened). The thermal retained strength glass profiles 404 and 406 were based on single layer glass articles subjected to thermally tempering (e.g., thermally tempered). The combined retained strength profile 408 was based on a laminated glass article with CTE mismatch subjected to thermal tempering (e.g., mechanically strengthened and thermally tempered).

As shown in FIG. 4, each of the strength profiles has a relatively high retained strength (e.g., at least about 250 MPa) near the outer surface of the glass article, which can aid in avoiding breakage of the glass article as a result of relatively shallow falls (e.g., less than about 10 µm). However, the combined retained strength profile 408 maintains a higher retained strength than the mechanical retained strength profile 402 deeper into the glass article (e.g., to a distance further from the surface of the clad layer). For example, the retained strength of the combined retained strength profile 408 is higher than that of mechanical retained strength profiles 402 for flaw sizes from about 5 µm to about 140 µm, which can aid in avoiding breakage of the glass article as a result of relatively deep flaws. Moreover, the retained strength of the combined retained strength profile 408 remains comparable with that of the thermal retained strength glass profiles 404 and 406 for flaw sizes greater than about 40 µm, with a significant improvement in strength for flaw sizes from about 25 µm to about 40 µm. Thus, improved resistance to breakage resulting from such flaw sizes translates into improved drop performance for a cover glass having a retained strength profile similar to the combined retained strength profile 408.

Figure 5:
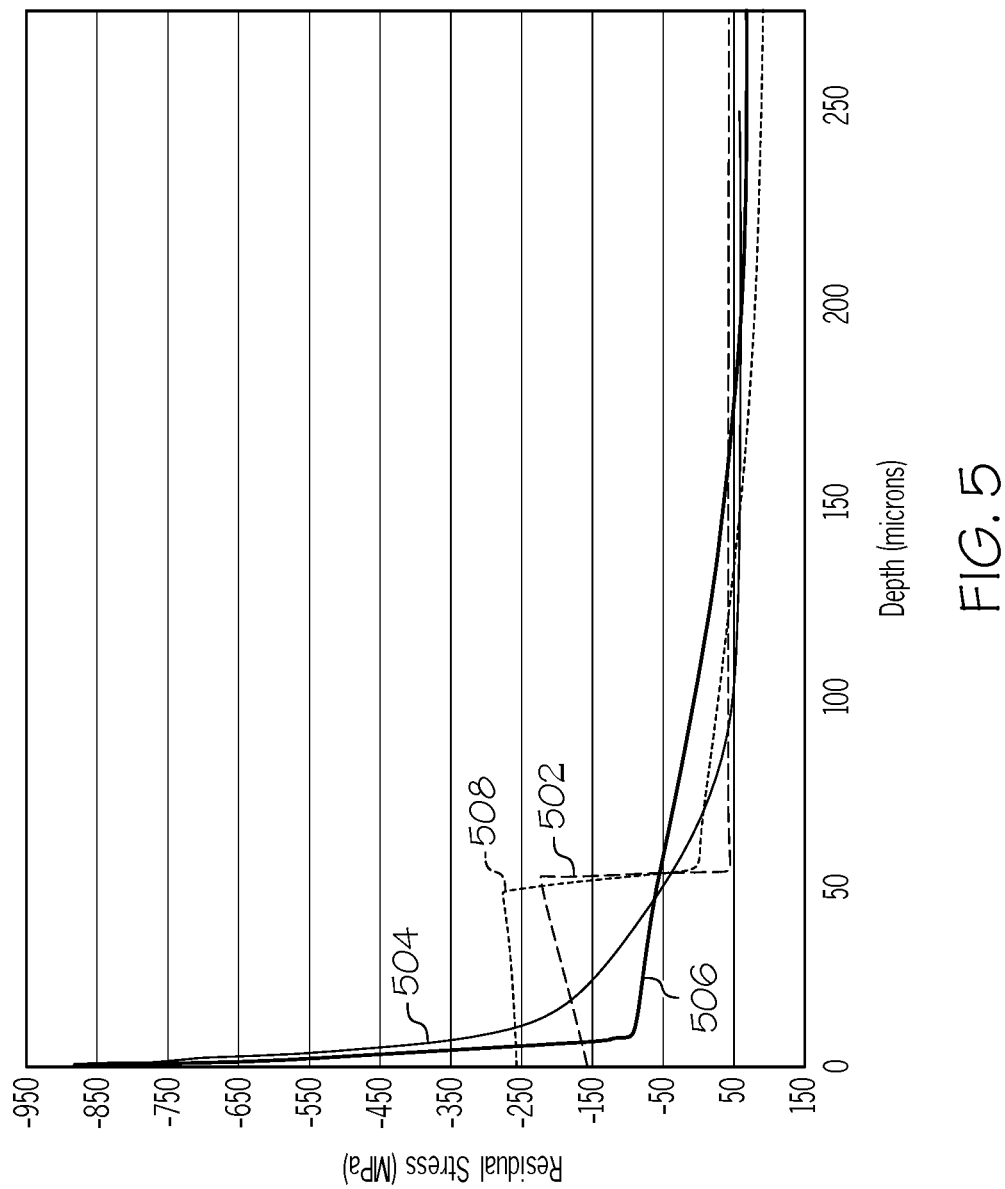
FIG. 5 is a plot of the residual stress of an example embodiment and three comparative examples in which the residual stress is plotted on the y-axis and the depth is plotted on the x-axis.

FIG. 5 depicts a residual stress model for the profiles depicted in FIG. 4. The residual stress profiles 502, 504, 506 and 508 were generated using a fracture mechanics simulation. The mechanical residual stress profile 502 was based on a laminated glass article including CTE mismatch. The thermal residual stress glass profiles 504 and 506 were based on single layer glass articles subjected to thermally tempering. The combined residual stress profile 508 was based on a laminated glass article with CTE mismatch subjected to thermal tempering.

As shown in FIG. 5, the combined residual stress profile 508 has a relatively constant amount of compressive stress for a depth of compression (DOC) of up to about 50 µm, which corresponds to the interface region between the clad layer and the core layer. The compressive stress in the combined residual stress profile 508 is significantly greater than the residual compressive stress in the comparative residual stress profiles for depths of at least 25 µm to 50 µm. Additionally, the compressive stress remains relatively constant through the DOC to the interface region, which may prevent surface flaws from developing into cracks. At the interface region between the clad layer and the core layer, the stress transitions from compressive stress in a step-change to a minimum tensile stress, which increases smoothly and continuously from the step-change through the core layer.

In addition to providing improved strength and stress profiles, in various embodiments, the combined mechanical and fictivation of the glass article can provide improved resistance to sharp contact damage events, as evidenced by the Vickers scratch threshold and indentation test performance and Knoop scratch test performance.

The Vickers indentation threshold measurements described herein are performed by applying and then removing an indentation load to the glass surface at a rate of 0.2 mm/min. The maximum indentation load is held for 10 seconds. The indentation threshold is defined at the indentation load at which 50% of 10 indents exhibit any number of radial/median cracks emanating from the corners of the indent impression. The maximum load is increased until the threshold is met for a given glass composition. All indentation measurements are performed at room temperature in 50% relative humidity.

The Vickers scratch threshold refers to the load at which lateral cracking is first observed in a glass article in response to scratching the surface of the glass article with a Vickers indenter at increasing load. The test procedure is similar to that used to determine Knoop scratch threshold, except that the Vickers indenter is substituted for the Knoop diamond. The lateral cracking is evidenced by sustained cracks in the glass article that are greater than twice the width of the original scratch or groove formed by the Vickers indenter.

Knoop scratch thresholds (KST) described herein are determined using a Knoop diamond indenter. The scratch threshold is determined by first identifying the load range for lateral crack onset. Once the load range is identified, a series of 5 mm long scratches under increasing constant load with three or more scratches per load are generated at a speed of 4 mm/s in order to identify the Knoop scratch threshold. Lateral cracks are defined as sustained cracks that are larger than twice the width of the groove.

Table 1 provides the change (Δ) in minimum and maximum Vickers scratch threshold, Vickers indentation threshold, and Knoop scratch threshold values for an example glass article having a thickness of 0.55 mm that was mechanically and thermally tempered (Example 1) as compared to an identical glass article that was mechanically strengthened.

TABLE 1

| Δ Minimum and Maximum Values | | |
|---|---|---|
| | Δ minimum | Δ maximum |
| Vickers Indentation (kg) | 1 N | 2 N |
| Knoop Scratch (N) | 1 N | −1 N |
| Vickers Scratch (N) | 2 N | 3 N |

As shown by the data provided in Table 1, the combination of thermal tempering and mechanical strengthening of the glass article can result in an increased minimum scratch/indentation fracture resistance, as well as an increased maximum both Vickers scratch and Vickers indentation values.

In one or more embodiments, the glass articles described herein further exhibit improved surface strength when subjected to abraded ring-on-ring (AROR) testing. The strength of a material is defined as the stress at which fracture occurs. The AROR test is a surface strength measurement for testing flat glass specimens, and ASTM C1499-09(2013), entitled "Standard Test Method for Monotonic Equibiaxial Flexural Strength of Advanced Ceramics at Ambient Temperature,"

serves as the basis for the AROR test methodology described herein. The contents of ASMT C1499-09 are incorporated herein by reference in their entirety. In embodiments, the glass specimen is abraded prior to ring-on-ring testing with 90 grit silicon carbide (SiC) particles that are delivered to the glass sample using the method and apparatus described in Annex A2, entitled "Abrasion Procedures," of ASMT C158-02(2012), entitled "Standard Test Methods for Strength of Glass by Flexure (Determination of Modulus of Rupture). The contents of ASTM C158-02 and the contents of Annex 2 in particular are incorporated herein by reference in their entirety.

Prior to ring-on-ring testing, a surface of the glass article is abraded as described in ASTM C158-02, Annex 2, to normalize and/or control the surface defect condition of the sample using the apparatus shown in Figure A2.1 of ASTM C158-02. The abrasive material is sandblasted onto the surface of the glass article at a predetermined pressure. After air flow is established, 5 cm$^3$ of abrasive material is dumped into a funnel and the sample is sandblasted for 5 seconds after introduction of the abrasive material.

Figure 6:
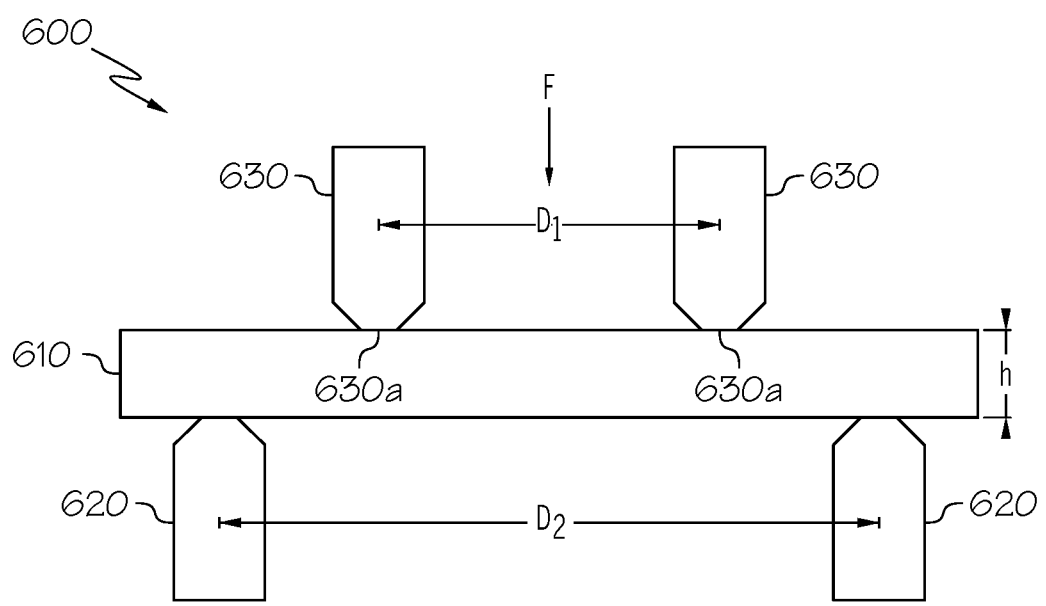
FIG. 6 is a schematic cross-sectional view of a ring-on-ring apparatus.

For the ring-on-ring test, a glass article having at least one abraded surface is placed between two concentric rings of differing size, as shown in FIG. 6, to determine equibiaxial flexural strength (i.e., the maximum stress that a material is capable of sustaining when subjected to flexure between two concentric rings). In the abraded ring-on-ring configuration 600, the abraded glass article 610 is supported by a support ring 620 having a diameter D2. A force F is applied by a load cell (not shown) to the surface of the glass article by a loading ring 630 having a diameter D1.

The ratio of the diameters of the loading ring and support ring D1/D2 may be in a range from about 0.2 to about 0.5. In some embodiments, D1/D2 is about 0.5. Loading and support rings 630, 620 should be aligned concentrically to within 0.5% of support ring diameter D2. The load cell used for testing should be accurate to within ±1% at any load within a selected range. In some embodiments, testing is carried out at a temperature of 23±2° C. and a relative humidity of 40±10%.

For fixture design, the radius r of the producing surface of the loading ring 630, h/2≤r≤3h/2, where h is the thickness of the glass article 610. Loading and support rings 630, 620 are typically made of hardened steel with hardness HRc>40. ROR fixtures are commercially available.

The intended failure mechanism for the ROR test is to observe fracture of the glass article 610 originating from the surface 630a within the loading ring 630. Failures that occur outside of this region—i.e., between the loading rings 630 and support rings 620—are omitted from data analysis. Due to the thinness and high strength of the glass article 610, however, large deflections that exceed ½ of the specimen thickness h are sometimes observed. It is therefore not uncommon to observe a high percentage of failures originating from underneath the loading ring 630. Stress cannot be accurately calculated without knowledge of stress development both inside and under the ring (collected via strain gauge analysis) and the origin of failure in each specimen. AROR testing therefore focuses on peak load at failure as the measured response.

The strength of the glass article depends on the presence of surface flaws. However, the likelihood of a flaw of a given size being present cannot be precisely predicted, as the strength of glass is statistical in nature. A probability distribution can therefore generally be used as a statistical representation of the data obtained.

Figure 7:
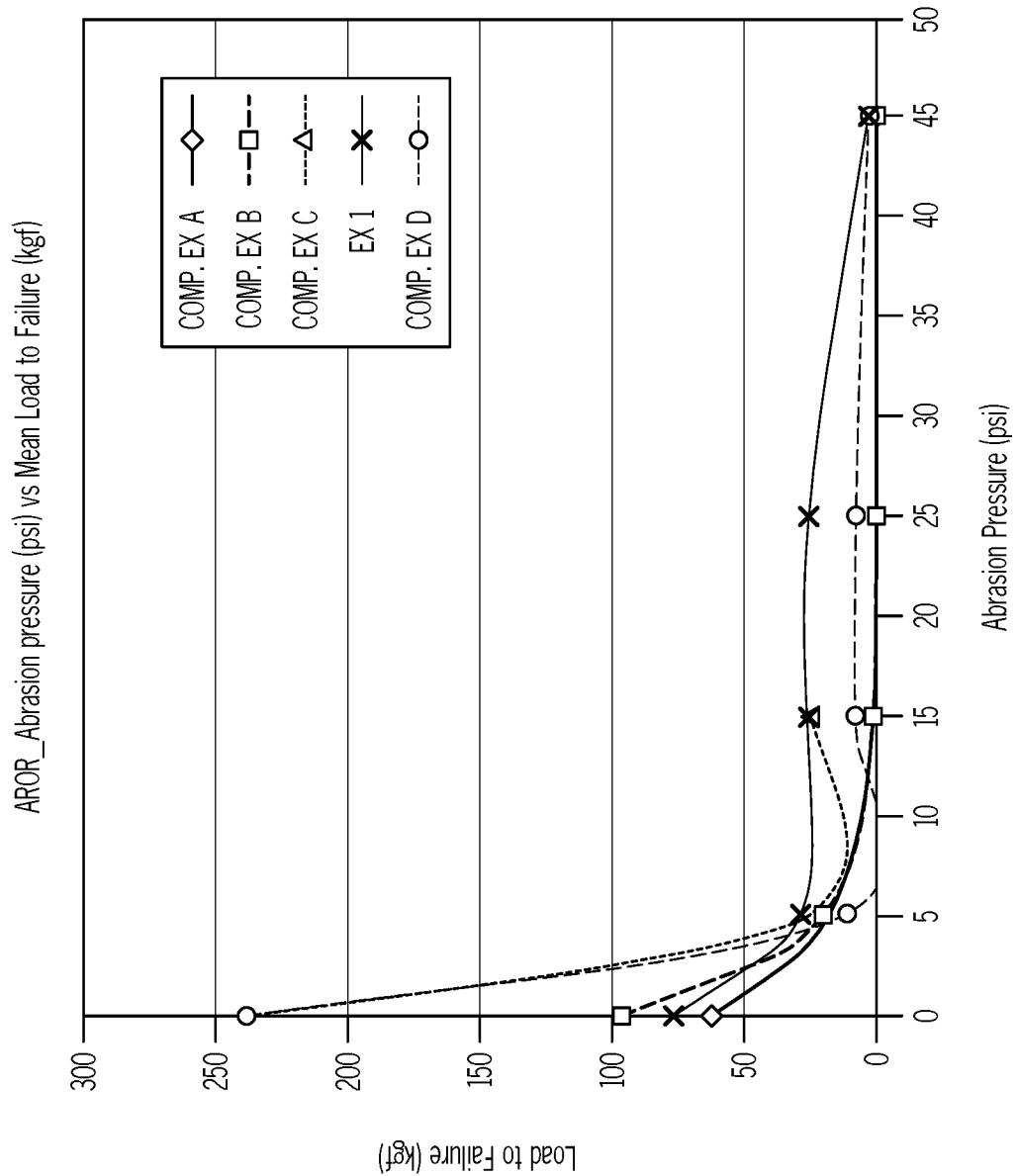
FIG. 7 is a plot of the results of the abraded ring-on-ring test for Example 1 and Comparative Examples A, B, D, and 1 in which the load to failure is plotted on the y-axis and the abrasion pressure is plotted on the x-axis.

FIG. 7 depicts a graph of the load to failure (on the y-axis) as a function of the abrasion pressure (on the x-axis) for Example 1 and Comparative Examples A, B, C, and D. Table 2 provides a description of Example 1 and Comparative Examples A-D.

TABLE 2

Description of Example 1 and Comparative Examples A-D

| Sample | Thickness (mm) | Condition |
|---|---|---|
| Example 1 | 0.55 | Laminated; thermal tempered |
| Comp. Ex. A | 0.3 | Laminated; NIX |
| Comp. Ex. B | 0.3 | Laminated; IOX |
| Comp. Ex. C | 0.55 | Laminated; IOX |
| Comp. Ex. D | 0.5 | IOX; single layer |

As shown in FIG. 7, for pressures above about 5 psi, Example 1 exhibits a substantially constant retained strength until about 35 psi. Accordingly, the glass article that is mechanically and thermally strengthened is relatively insensitive to the depth of damage, whereas the Comparative Examples exhibit greater changes in strength over the same interval. FIG. 7 also demonstrates that the fictivated laminate had exceptional performance, exhibiting almost twice the retained strength at 25 psi than Comparative Example D.

In various embodiments, the second layer (e.g., the first clad layer 104 and/or the second clad layer 106) comprise a relatively low CTE, ion-exchangeable glass composition, and the first layer (e.g., the core layer 102) comprises a relatively high CTE ion-exchangeable glass composition. Exemplary glass compositions that may be suitable for use in the second layer include those described in U.S. Patent Application Publication No. 2014/0141217 and U.S. Patent Application Publication No. 2015/0030827, each of which is incorporated herein by reference in its entirety. Exemplary glass compositions that may be suitable for use in the first layer include those described in U.S. Patent Application Publication No. 2014/0141217 and U.S. Patent Application Publication No. 2015/0037552, each of which is incorporated herein by reference in its entirety.

Chemical Strengthening

In various embodiments described herein, the glass article 100 may be strengthened by a combination of mechanical strengthening and chemical strengthening as an alternative to, or in addition to, thermal tempering. For example, the glass article 100 may have a CTE mismatch as described herein, and may be chemically strengthened to further increase the compressive stress through at least the clad layer as compared to lamination or CTE mismatch alone.

In various embodiments described herein, after being mechanically strengthened as described in detail above, the glass article 100 is chemically strengthened. For example, the glass article 100 may be subjected to a dual ion exchange treatment to increase the compressive stress in a region of the glass article at an outer surface of the glass article (e.g., an outer portion of the clad layer). In some embodiments, the ion exchange treatment comprises applying an ion exchange medium to one or more surfaces of the glass article 100 or otherwise contacting the laminated glass article 100 with an ion exchange medium (e.g., an ion exchange bath). The ion exchange medium may be a solution, a paste, a gel, or another suitable medium comprising one or more ion sources or sources of larger ions to be exchanged with smaller ions in the glass network (e.g., the glass network of the second layer). The terms "larger ions" and "smaller ions" are relative terms, meaning that the larger ions are relatively large compared to the smaller ions and the smaller ions are relatively small compared to the larger ions. Thus, the larger ions have a larger ionic radius than the smaller ions, and the smaller ions have a smaller ionic radius than the larger ions. In some embodiments, the second layer of the glass article 100 comprises an alkali aluminosilicate glass. Thus, the smaller ions in the surface layer of the glass and the larger ions in the ion exchange medium may be monovalent alkali metal cations (e.g., $Li^+$, $Na^+$, and/or $K^+$). Alternatively, monovalent cations in the glass article 100 may be replaced with monovalent cations other than alkali metal cations (e.g., $Ag^+$ or the like). In some embodiments, the second layer of the glass article 100 comprises an alkaline earth aluminosilicate glass. In some embodiments, the ion exchange medium comprises a molten salt solution, and the ion exchange treatment comprises immersing the laminated glass article in a molten salt bath comprising larger ions to be exchanged with smaller ions (e.g., $Na^+$, $Li^+$, $Ca^{2+}$, and/or $Mg^{2+}$) in the glass matrix. In some embodiments, the molten salt bath comprises a salt (e.g., a nitrate, a sulfate, and/or a chloride) of the larger ions. For example, the molten salt bath may include molten $KNO_3$, molten $NaNO_3$, or a combination thereof. Additionally or alternatively, the temperature of the molten salt bath may be from about 380° C. to about 450° C., and an immersion time is from about 2 hours to about 16 hours.

In various embodiments described herein, the ion exchange medium includes at least two ion sources (e.g., at least two cations). In some embodiments, a single ion exchange medium may include both ion sources, while in other embodiments, a first ion exchange medium may include a first ion source while a second ion exchange medium may include a second ion source. For example, in some embodiments, the ion exchange medium may include $Na^+$ and $K^+$ ions (or salts thereof), which may be used to adjust the stress at different points in the stress profile. In other embodiments, the glass article may be contacted with a first ion exchange medium that includes Na+ ions and then may be contacted with a second ion exchange medium that includes K+ ions. By replacing smaller ions in the glass matrix with larger ions at the surface of the glass article 100, the compressive stress of the second layer is increased at the outer surface of the glass article. For example, during the ion exchange treatment, the larger ions from the ion exchange medium diffuse into an outer portion of the second layer of the glass article 100 and the smaller ions from the glass matrix diffuse out of the outer portion of the second layer of the glass article. Thus, the outer portion of the second layer comprises an exchanged region of the glass article. The increased concentration of the larger ions in the ion exchanged region causes crowding of the glass network and increases the compressive stress of the glass article 100 in the ion exchanged region. In some embodiments, subjecting the glass article 100 to the ion exchange treatment increases a surface compressive stress at the outer surface of the glass article (e.g., from an initial surface compressive stress generated by the CTE mismatch) to a final compressive stress value. For example, the final compressive stress value is at least about 200 MPa, at least about 300 MPa, at least about 400 MPa, at least about 500 MPa, at least about 600 MPa, at least about 700 MPa, at least about 800 MPa, at least about 900 MPa, or at least about 1,000 MPa. Additionally or alternatively, the final compressive stress value is less than about 1300 MPa, less than about 1200 MPa, less than about 1000 MPa, less than about 900 MPa, or less than about 800 MPa.

Moreover, in various embodiments, the glass article may have a depth of compression (DOC) of greater than or equal to 50 µm. For example, the glass article may have a DOC of greater than or equal to 70 µm, greater than or equal to 100 µm, or even greater than or equal to 200 µm. The DOC may be achieved by ion exchange in addition to increasing a thickness of the clad layer.

Figure 8:
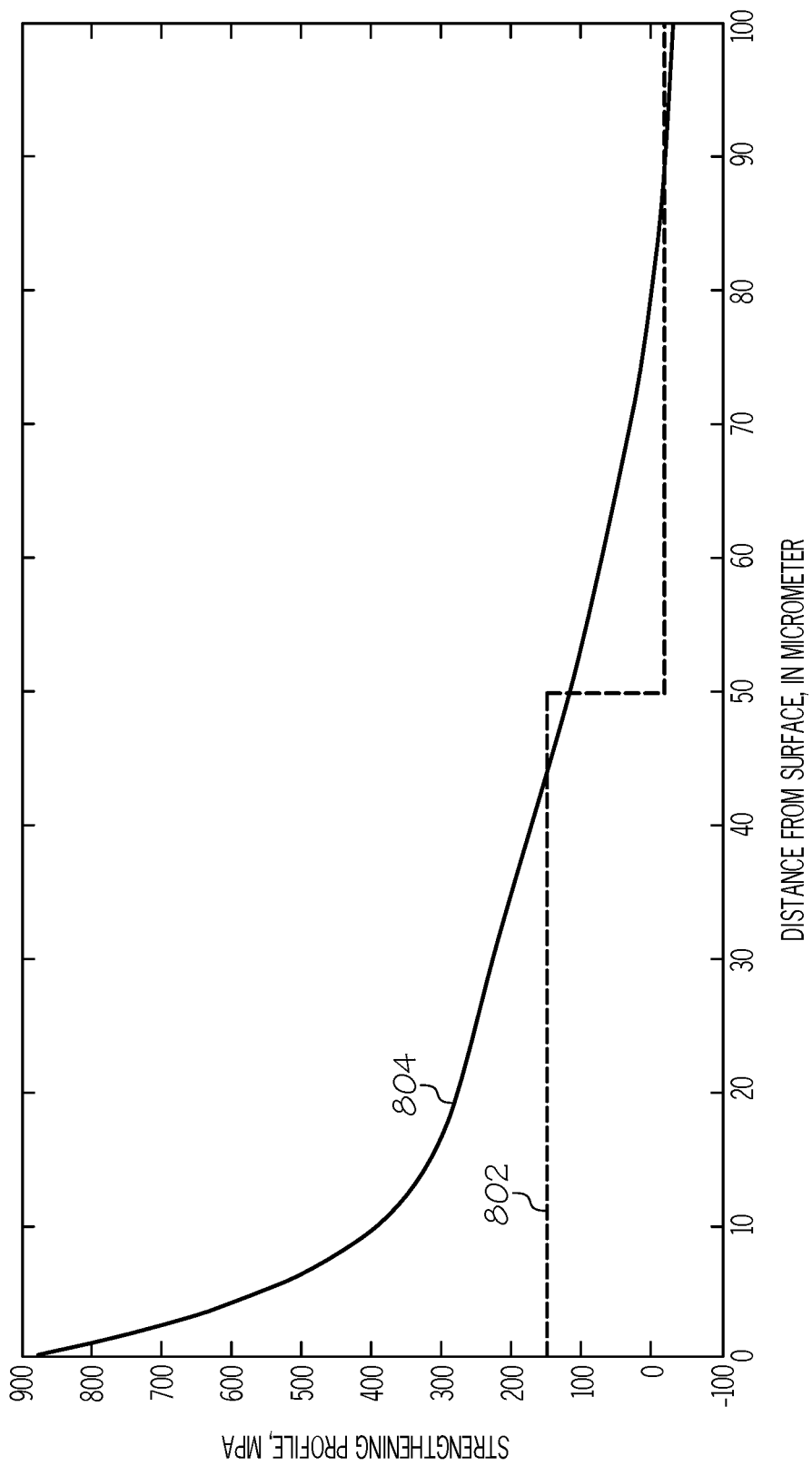
FIG. 8 is a plot of the residual stress of a laminated glass article having a CTE mismatch between layers of the glass article and the residual stress of a single layer of glass that was chemically strengthened in which the residual stress is plotted on the y-axis and the depth is plotted on the x-axis.

FIG. 8 is a graphical illustration comparing an example mechanical stress profile 802 generated by CTE mismatch alone and an example chemical stress profile 804 generated by chemical strengthening alone. The stress profiles are represented by the stress as a function of depth within the glass article 100. The depth within the glass article 100, given as the distance from an outer surface of the glass article 100, is plotted on the x-axis and the stress is plotted on the y-axis.

Referring to the mechanical stress profile 802, the compressive region (e.g., the clad layer) has a thickness (e.g., a DOC) of about 50 µm and a first compressive stress of about 150 MPa. Mechanical stress 302 is a step function. Thus, the compressive stress remains substantially constant from the surface through the clad layer, and transitions to the maximum tensile stress as a step-change at an interface region between the clad layer and the core layer.

Referring to the chemical stress profile 804, the compressive region extends to a depth of compression (DOC) of about 80 µm and has a surface compressive stress of about 900 MPa. The stress transitions continuously from the surface compressive stress at the outer surface of the compressive region to the maximum tensile stress within the tensile region. Thus, in contrast to the mechanical stress profile 802, the chemical stress profile 804 does not have a region of constant compressive stress or a step-change between the compressive stress region and the tensile region.

Figure 9:
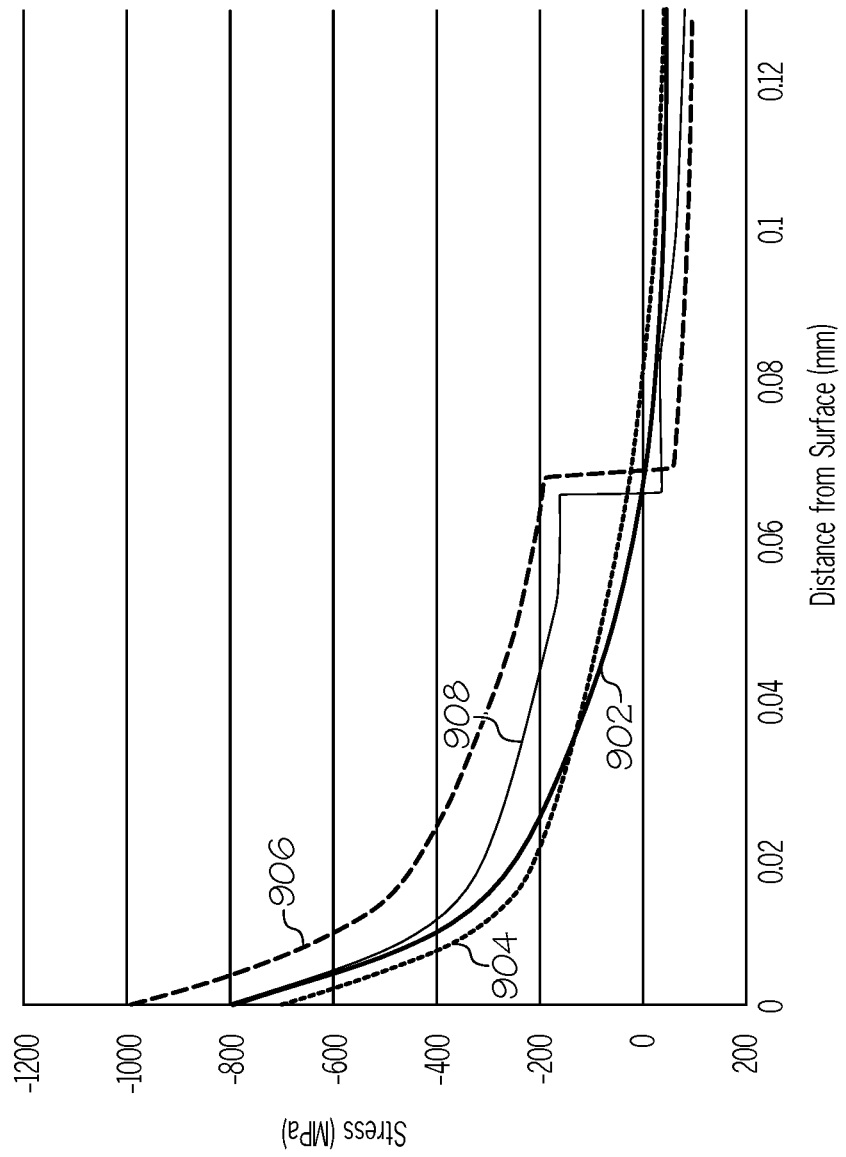
FIG. 9 is a plot of various examples of stress profiles formed from chemical strengthening and combined stress profiles formed a combination of mechanical strengthening and chemical strengthening in which the residual stress is plotted on the y-axis and the depth is plotted on the x-axis.

In various embodiments, the glass article 100 is strengthened by a combination of mechanical strengthening and chemical strengthening. For example, the glass article 100 having a CTE mismatch as described herein (e.g., a glass laminate) is chemically strengthened to further increase the compressive at the outer surface of the compressive layer. FIG. 9 is a graphical illustration of various examples of stress profiles formed from chemical strengthening and combined stress profiles formed a combination of mechanical strengthening and chemical strengthening.

It will be recognized that FIG. 9 illustrates only a portion of each of the stress profiles through a portion of the thickness of the glass article (e.g., through one clad layer and a portion of the core layer). For a symmetrical glass article (e.g., a core layer positioned between two clad layers having identical thickness and glass composition), the stress profiles through the remaining portion of the thickness of the glass article is a mirror image of the illustrated portions of the stress profiles in FIG. 9. In the examples shown in FIG. 9, the stress profile 902 and the stress profile 904 correspond to profiles for glass that was chemically strengthened using a dual ion exchange treatment as described herein. The stress profile 906 and the stress profile 908 are stress profiles for glass articles that were mechanically strengthened and chemically strengthened using a dual ion exchange treatment. In particular, the glass article that has the stress profile 908 has a lower CTE difference between laminate layers, a lower peak CS, and a shallower depth of layer for the ion exchange and step-change. Stress profile 902 corresponds to the dual ion exchanged used for the glass laminate of stress profile 906 and stress profile 904 corresponds to the dual ion exchange used for the glass laminate of stress profile 908.

The compressive stress in each of stress profiles 906 and 908 decreases continuously from a first compressive stress of about 1000 MPa and 800 MPa, respectively, with increasing distance from the outer surface of the clad layer and then transitions to the minimum tensile stress as a step-change at an interface region between the core layer and the clad layer. A magnitude of tensile stress increases continuously from the step-change to the maximum tensile stress in the core layer. In contrast, the compressive stress in each of the stress profiles 902 and 904 decreases continuously with increasing distance from the outer surface of the clad layer and smoothly transitions to a maximum tensile stress in the core layer.

In some embodiments, the glass article 100 is chemically strengthened to increase the compressive stress throughout the clad layer. Thus, the chemical strengthening is performed in such a manner that nearly the entire thickness of the clad layer is chemically strengthened and the stress is increased throughout the compressive layer as compared to a non-laminated glass exposed to the same ion exchange treatment.

The retained strength of a glass article can be determined based on the stress profile of the glass article. For example, the retained strength is determined by forming a flaw extending from a surface of the glass article to a specified depth and then determining the strength of the glass article after formation of the flaw.

Figure 10:
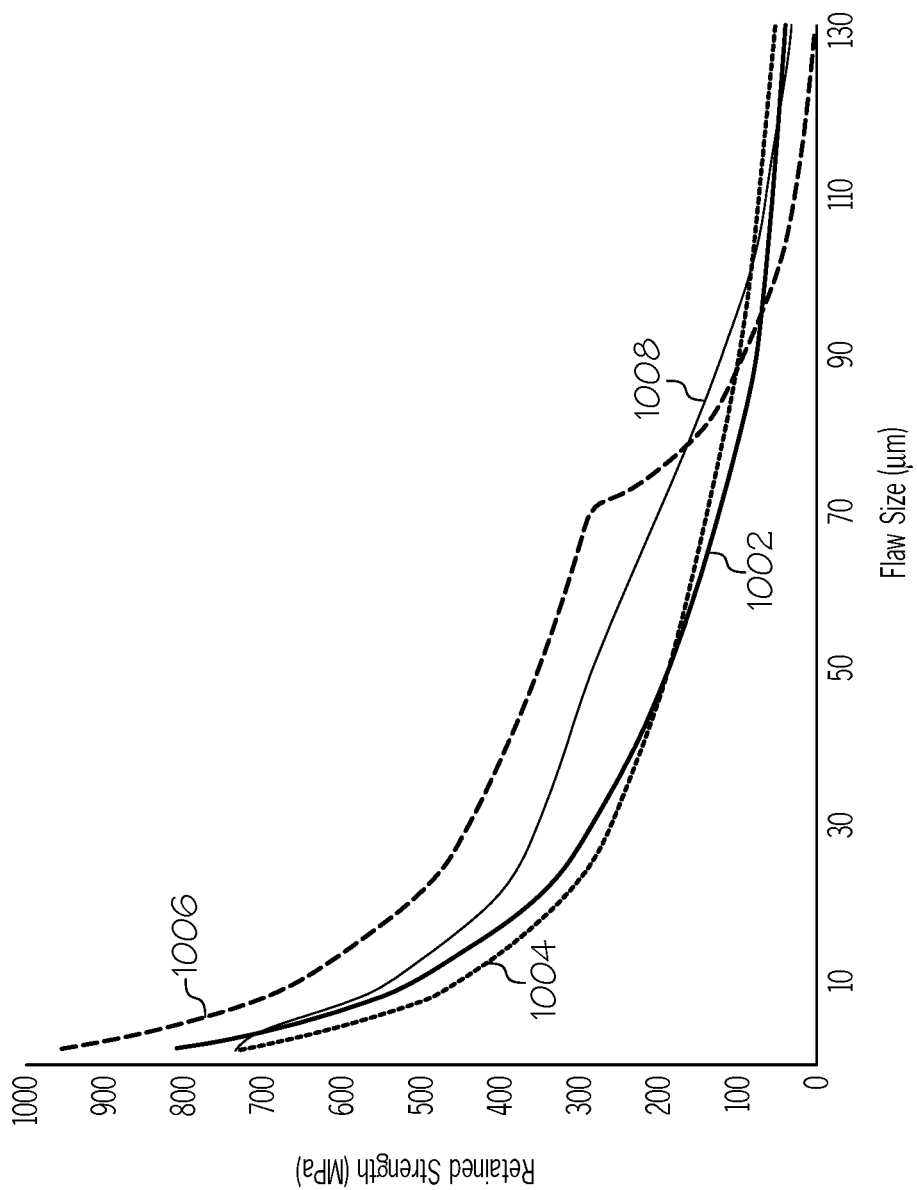
FIG. 10 is a plot of various examples of retained strength profiles formed from chemical strengthening and combined retained strength profiles formed a combination of mechanical strengthening and chemical strengthening in which the retained strength is plotted on the y-axis and the depth is plotted on the x-axis.

FIG. 10 is a graphical illustration comparing example retained strength profiles corresponding to stress profiles generated by chemical strengthening alone and a combination of mechanical strengthening and chemical strengthening. The retained strength profiles are represented by the retained strength as a function of flaw size. The flaw size, given as the distance from an outer surface of the glass article to the point to which the flaw extends, is plotted on the x-axis, and the retained strength is plotted on the y-axis.

Chemical retained strength profiles 1002 and 1004 were generated using a fracture mechanics simulation based on the chemical stress profiles 902 and 904 shown in FIG. 9, respectively. Combined retained strength profiles 1006 and 1008 were generated using a fracture mechanics simulation based on the combined stress profiles 906 and 908 shown in FIG. 9, respectively.

As shown in FIG. 10, each of the strength profiles has a relatively high retained strength (e.g., at least about 200 MPa) near the outer surface of the glass article, which can aid in avoiding breakage of the glass article as a result of relatively shallow falls (e.g., less than about 10 µm). However, the combined retained strength profiles 1006 and 1008 maintain a higher retained strength than the chemical retained strength profiles 1002 and 1004 deeper into the glass article. For example, the retained strength of the combined retained strength profiles 1006 and 1008 is higher than that of chemical retained strength profiles 1002 and 1003 for flaw sizes from about 5 µm to about 90 µm, which can aid in avoiding breakage of the glass article as a result of relatively deep flaws. Thus, improved resistance to breakage resulting from such flaw sizes translates into improved drop performance for a cover glass having a retained strength profile similar to the combined retained strength profile 1006 and/or the combined retained strength profile 1008. Moreover, the improved resistance to breakage resulting from large flaws can be achieved by the combined retained strength profile 1006 and/or the combined retained strength profile 1008 without substantially increasing the maximum tensile stress of the tensile region as compared to the retained strength profile 1002 and/or the retained strength profile 1004. For example, increasing the compressive stress relatively deep into the compressive region (e.g., such as by increasing the DOC) can help to maintain the area under the compressive portion of the stress profile curve, which is proportional to the maximum tensile stress in the tensile region, relatively low while also providing protection against breakage caused by relatively deep flaws. Thus, the maximum tensile stress can be maintained below the frangibility limit. Additionally or alternatively, the thickness of the compressive region is sufficiently large to maintain relatively high compressive stress deep into the glass article (e.g., to achieve improved resistance to breakage resulting from large flaws) without increasing the maximum tensile stress to an unacceptable level (e.g., above the frangibility limit). The frangibility limit can be determined, for example, as described in U.S. Patent Application Publication No. 2010/0035038, which is incorporated herein by reference in its entirety.

The high surface compression can help to prevent flaws from propagating within the depth of the glass article. Additionally, the continued high compression level, although decreasing with increasing depth, meets the flaw through a greater depth of the glass article described herein. Such an increase in compressive stress can help to arrest the propagation of the flaw. Thus, the increased compression can provide improved resistance to flaw propagation compared to a glass article strengthened by mechanical strengthening alone. Moreover, because the clad layer is under compressive stress from the CTE mismatch prior to any chemical strengthening, the glass article can have a higher surface compressive stress compared to a glass article strengthened by ion exchange alone. Thus, by combining mechanical strengthening and dual ion exchange, the benefits of the compressive peak can be achieved without sacrificing the relatively high surface compressive stress that can help to prevent formation of surface flaws.

If a flaw does propagate beyond surface, the compressive stress extending relatively deep into the glass article can help to prevent failure of the glass article as a result of the flaw (e.g., by preventing the flaw from reaching the core layer that is in tension). Thus, the presence of the increased compression through a greater depth of the glass article (e.g., provided by mechanical strengthening) can provide improved resistance to failure compared to a glass article strengthened by chemical strengthening alone and having a rapidly decreasing compressive stress deeper into the glass article. Accordingly, the stress profile generated by the combination of mechanical strengthening and dual ion exchange strengthening as described herein can enable improved performance of the glass article compared to conventional strengthening techniques.

In some embodiments, the position of the compressive peak can be tailored to form a glass article with a determined stress profile adapted for a particular application. For example, the time and/or the temperature for the ion exchange region can be increased such that the ion exchanged region of the second layer extends deeper into the glass article. Thus, the position of the compressive peak can be shifted deeper into the glass article. Alternatively, the time and/or temperature of the ion exchange treatment can be decreased such that the ion exchanged region of the second layer extends shallower into the glass article. Thus, the position of the compressive peak can be shifted shallower into the glass article. Positioning the compressive peak deeper within the glass article can help to improve the reliability of the glass article, represented by retained strength, compared to positioning the compressive peak shallower within the glass article, for the same central tension. However, positioning the compressive peak shallower within the glass article can help to improve the strength of the glass article compared to positioning the compressive peak deeper within the glass article, for the same central tension. Thus, the compressive peak can be positioned to balance strength and reliability.

Figure 11:
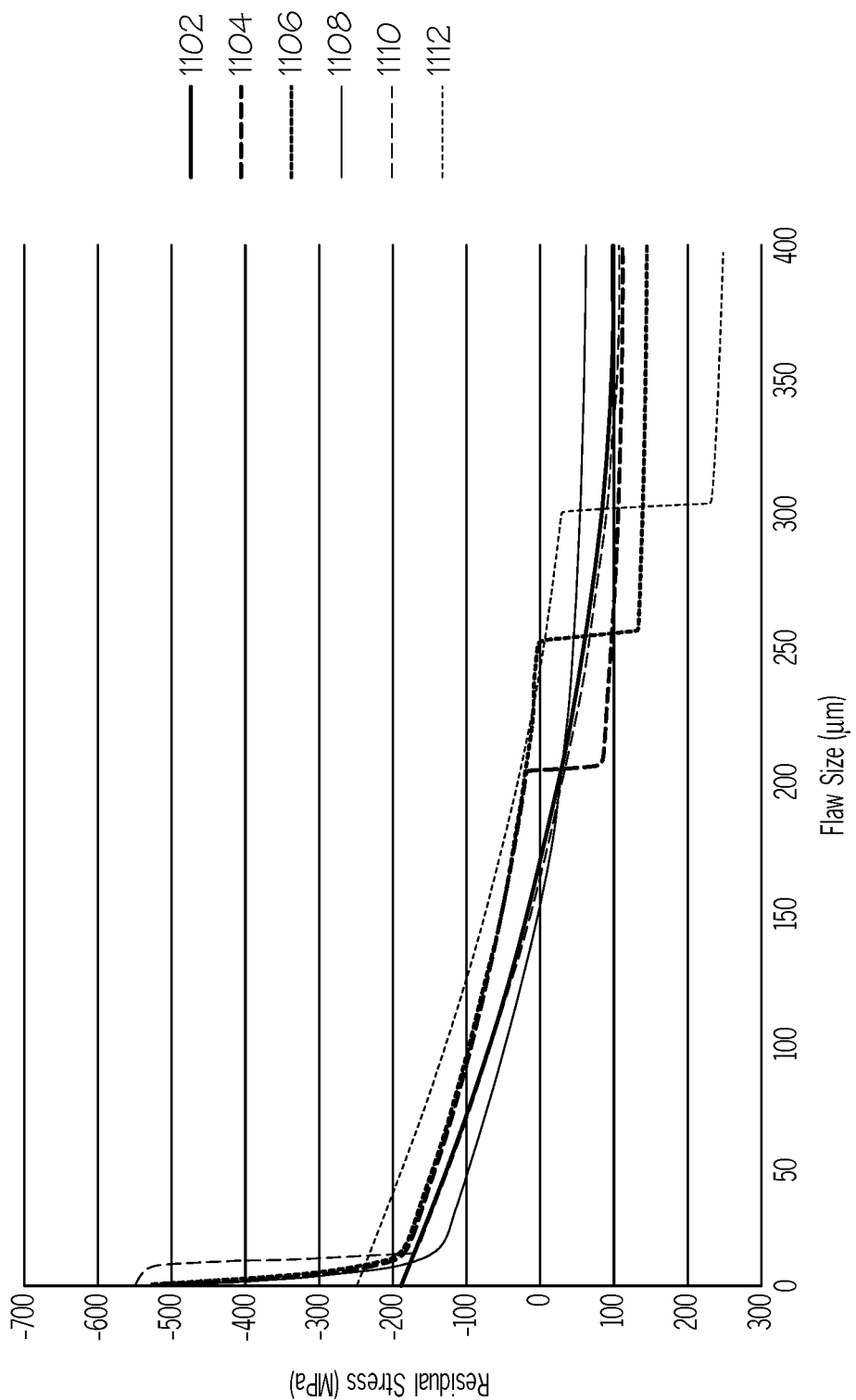
FIG. 11 is a plot of the residual stress of various example embodiments and comparative examples in which the residual stress is plotted on the y-axis and the depth is plotted on the x-axis.

Moreover, in various embodiments, the thickness of the clad layer may be adjusted to provide for a varying depth of compression (DOC) as well as improved retained strength for flaws of various ranges. FIG. 11 depicts various stress profiles that have been adjusted to provide various depths of compression. In FIG. 11, stress profile 1102 corresponds to a single glass sheet that was ion exchanged. Accordingly, stress profile 1102 has a parabolic shape and a compressive stress spike at the surface. In other words, the compressive stress peaks at the surface of the glass article, and decreases continuously, smoothly transitioning from compression to tension and to a maximum tension at the middle of the glass article. Stress profiles 1104 and 1106 correspond to laminated glass articles with 200 μm and 250 μm thick clad layers, respectively. Each glass article was ion exchanged. Accordingly, each stress profile has a compressive stress spike at the surface of the glass article, and the compressive stress decreases continuously with increasing distance from the surface, then transitions to a minimum tensile stress as a step-change at an interface region between the core layer and the clad layer, and the magnitude of tensile stress increases continuously from the step-change to a maximum tensile stress. By comparing stress profile 1104 to stress profile 1106, it can be seen that the increased thickness of the clad layer increases the depth of compression from about 200 μm to about 250 μm.

Stress profiles 1108 and 1110 correspond to single layer glass articles that were ion-exchanged. As shown in FIG. 11, stress profile 1108 is parabolic in shape, having a compressive stress that decreases with increasing distance from an outer surface of the clad layer and smoothly transitions to a tensile stress. In contrast, stress profile 1110 includes a compressive stress spike at the outer surface of the clad layer, and the compressive stress decreases continuously with increasing distance from the outer surface of the clad layer, transitioning smoothly to a tensile stress. Stress profile 1112 corresponds to a glass laminate having a clad layer with a thickness of 300 μm, which drives the depth of compression deeper into the thickness of the glass. Additionally, in contrast to stress profiles 1104 and 1106, stress profile 1112 does not have a compressive stress spike at the surface of the clad layer. Accordingly, the compressive stress decreases with increasing distance from the outer surface of the clad layer, transitioned to a minimum tensile stress as a step-change at an interface region between the core layer and the clad layer, and a magnitude of tensile stress increases continuously from the step-change to a maximum tensile stress in the core layer.

Figure 12:
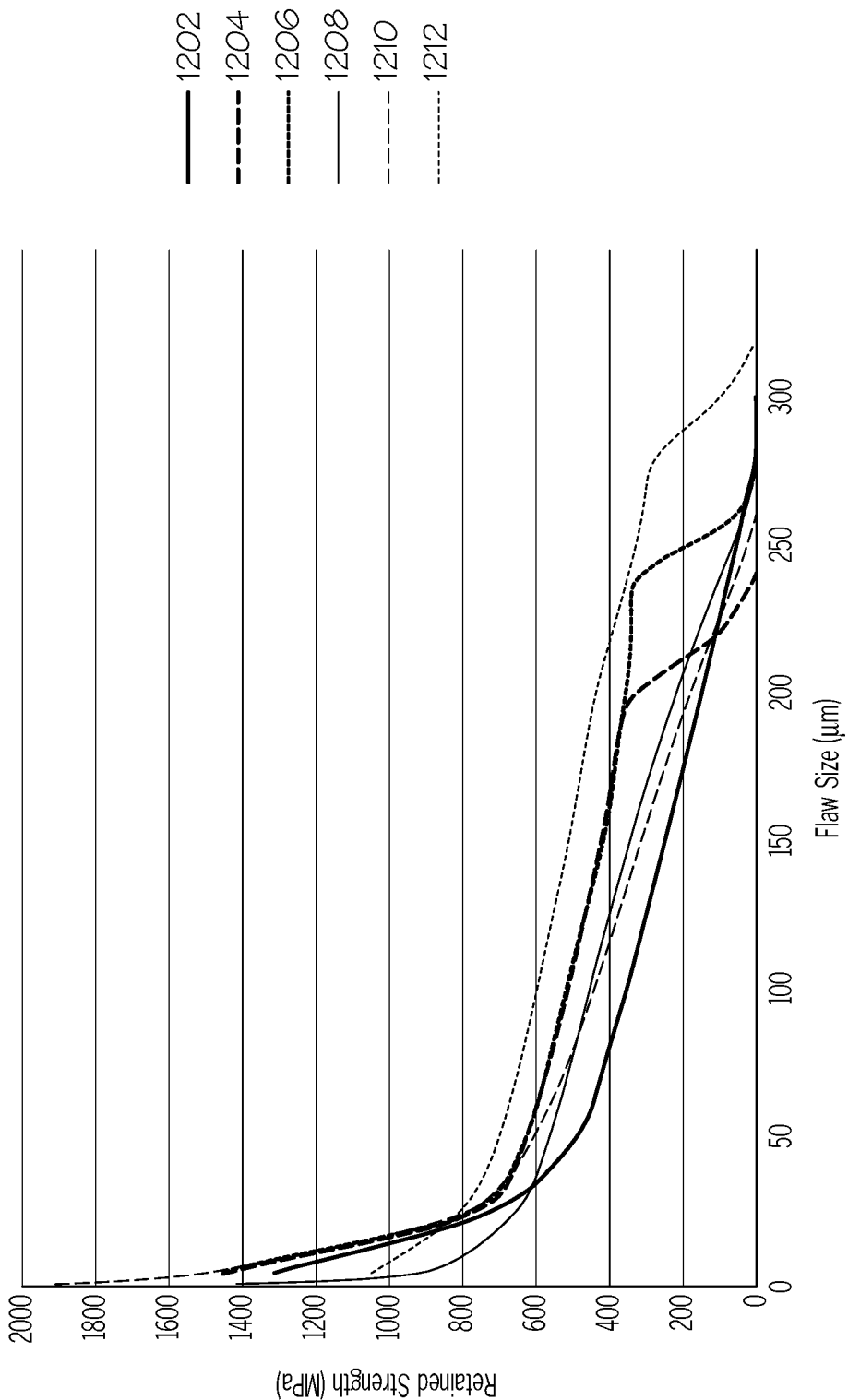
FIG. 12 is a plot of the retained strength of various example embodiments and comparative examples in which the retained strength is plotted on the y-axis and the depth is plotted on the x-axis.

FIG. 12 depicts the retained strength profiles that correspond to the stress profiles depicted in FIG. 11. As can be seen, the lamination of the glass articles coupled with ion-exchange treatment increases the strength for most flaw sizes, and increasing the depth of compression further increases the strength deeper into the glass article. In particular, strength profile 1212 exhibits a retained strength of greater than 300 MPa to a flaw size of nearly 275 μm, whereas strength profiles 1204 and 1206 exhibit similar strengths to flaw sizes of about 200 μm and 250 μm respectively. For single layer glass sheets, the strength profiles 1202, 1208, and 1210 have a continuously decreasing strength that drops below about 200 MPa at or before a depth of 200 μm. Accordingly, the retained strength can be adjusted by adjusting the DOC to address flaws of various sizes.

The glass articles described herein can be used for a variety of applications including, for example, for cover glass or glass backplane applications in consumer or commercial electronic devices including, for example, LCD and LED displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; or for commercial or household appliance applications. In various embodiments, a consumer electronic device (e.g., smartphones, tablet computers, personal computers, ultrabooks, televisions, and cameras), an architectural glass, and/or an automotive glass comprises a glass article as described herein.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A laminated glass article comprising:
   a core layer comprising a core glass composition having an average core coefficient of thermal expansion ($CTE_{core}$); and
   a clad layer directly adjacent to the core layer and comprising a clad glass composition having an average clad coefficient of thermal expansion ($CTE_{clad}$) that is less than the $CTE_{core}$ such that the clad layer is in compression and the core layer is in tension;
   wherein a compressive stress of the clad layer increases with increasing distance from the outer surface of the clad layer, transitions to a minimum tensile stress as a step-change at an interface region between the core layer and the clad layer, and a magnitude of tensile stress increases continuously from the step-change to a maximum tensile stress in the core layer.

2. The laminated glass article according to claim 1, wherein a surface compressive stress of the clad layer is at least 200 MPa.

3. The laminated glass article according to claim 1, wherein a surface compressive stress of the clad layer is at least 250 MPa.

4. The laminated glass article according to claim 1, wherein the laminated glass article comprises a depth of compression of up to 50 μm.

5. A method of preparing a glass article comprising:
   laminating at least one core layer and at least one clad layer to form a laminated glass article, the at least one core layer comprising a core glass composition having an average core coefficient of thermal expansion ($CTE_{core}$) and the at least one clad layer comprising a clad glass composition having an average clad coefficient of thermal expansion ($CTE_{clad}$) that is less than the $CTE_{core}$ such that the at least one clad layer is in compression and the at least one core layer is in tension;

heating the laminated glass article to a first temperature that is from 50° C. to 200° C. greater than a glass transition temperature $T_g$ of the laminated glass article;

equilibrating the laminated glass article at the first temperature for a predetermined period of time; and quenching the laminated glass article to a second temperature below a strain point of the laminated glass article, wherein after quenching, a compressive stress of the clad layer increases with increasing distance from the outer surface of the clad layer, transitions to a minimum tensile stress as a step-change at an interface region between the core layer and the clad layer, and a magnitude of tensile stress increases continuously from the step-change to a maximum tensile stress in the core layer.

6. The method according to claim 5, wherein the first temperature is greater than or equal to 750° C. and less than or equal to 900° C.

7. The method according to claim 5, wherein the second temperature is 25° C.±10° C.

8. The method according to claim 5, wherein one or more of (i) the core glass composition is an ion-exchangeable core glass composition and (ii) the clad glass composition is an ion-exchangeable clad glass composition.

9. The method according to claim 5, wherein after quenching, a surface compressive stress of the clad layer is at least 200 MPa.

\* \* \* \* \*